(12) United States Patent
Yamagata et al.

(10) Patent No.: US 10,532,841 B2
(45) Date of Patent: Jan. 14, 2020

(54) METHOD AND APPARATUS OF SUPPLYING A BAG

(71) Applicant: TOYO JIDOKI CO., LTD., Tokyo (JP)

(72) Inventors: Akihiro Yamagata, Iwakuni (JP); Shinobu Nishiguchi, Iwakuni (JP); Yasuyuki Honda, Iwakuni (JP); Kazuo Fukunaga, Iwakuni (JP); Manabu Morino, Iwakuni (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 56 days.

(21) Appl. No.: 15/987,073

(22) Filed: May 23, 2018

(65) Prior Publication Data

US 2018/0339870 A1 Nov. 29, 2018

(30) Foreign Application Priority Data

May 24, 2017 (JP) .................................. 2017-102866
Dec. 15, 2017 (JP) .................................. 2017-240945

(51) Int. Cl.
*B65B 43/42* (2006.01)
*B65B 43/46* (2006.01)
*B65B 35/16* (2006.01)
*B65G 65/00* (2006.01)
*B65B 31/02* (2006.01)
(Continued)

(52) U.S. Cl.
CPC ............ *B65B 43/42* (2013.01); *B65B 31/024* (2013.01); *B65B 43/465* (2013.01); *B65B 51/10* (2013.01); *B65G 47/244* (2013.01); *B65G 47/28* (2013.01); *B65G 65/005* (2013.01); *B65G 2201/0238* (2013.01); *B65G 2203/0225* (2013.01); *B65G 2203/0233* (2013.01)

(58) Field of Classification Search
CPC ........ B65B 35/16; B65B 43/42; B65B 43/465
See application file for complete search history.

(56) References Cited

U.S. PATENT DOCUMENTS 8,684,431 B2 * 4/2014 Setozaki ................ B65G 47/90
294/87.22
8,720,667 B2 * 5/2014 Koga ................... B65B 69/0008
198/430
(Continued)

FOREIGN PATENT DOCUMENTS

JP 2538473 B2 7/1996
JP 2002-308224 A 10/2002
(Continued)

*Primary Examiner* — Thomas Randazzo
(74) *Attorney, Agent, or Firm* — Pillsbury Winthrop Shaw Pittman, LLP

(57) ABSTRACT

A method and an apparatus of supplying a bag are provided in which position information on a bag width in a direction parallel to a conveyance path at a part in a neighborhood of a bag opening of a conveyed bag and position information on a center of the bag width are obtained, an intermittent conveyance distance of a conveyance unit is adjusted based on the position information on the center of the bag width so that the center of the bag width of the bag stopping at a takeoff position is placed on a reference plane, and an interval of the pair of holding members positioned at the takeoff position is adjusted based on the position information on the bag width.

20 Claims, 27 Drawing Sheets

(51) Int. Cl.
*B65B 51/10* (2006.01)
*B65G 47/244* (2006.01)
*B65G 47/28* (2006.01)

(56) References Cited

U.S. PATENT DOCUMENTS

| | | | | |
|---|---|---|---|---|
| 2002/0148206 | A1* | 10/2002 | Ikemoto | B65B 43/465 53/570 |
| 2014/0352253 | A1* | 12/2014 | Yamamoto | B65B 43/16 53/76 |
| 2015/0217889 | A1* | 8/2015 | Nakamoto | B65B 43/465 198/678.1 |
| 2017/0152067 | A1* | 6/2017 | Nakamoto | B65B 43/26 |
| 2018/0093787 | A1* | 4/2018 | Fukeda | B65B 43/44 |
| 2018/0118393 | A1* | 5/2018 | Yoshikane | B65B 43/465 |

FOREIGN PATENT DOCUMENTS

| | | | | |
|---|---|---|---|---|
| JP | 2002308224 | A * | 10/2002 | B65B 43/46 |
| JP | 2013-244967 | A | 12/2013 | |

* cited by examiner

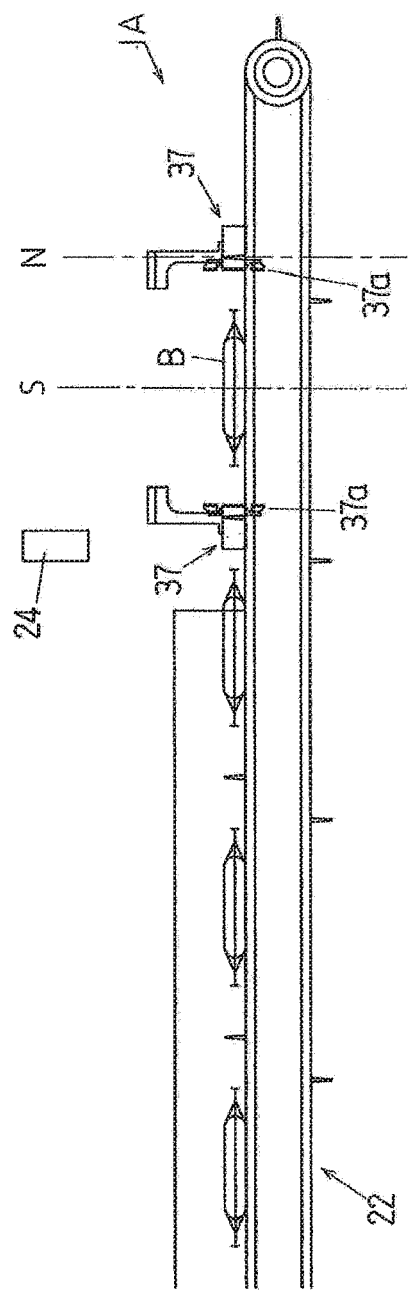
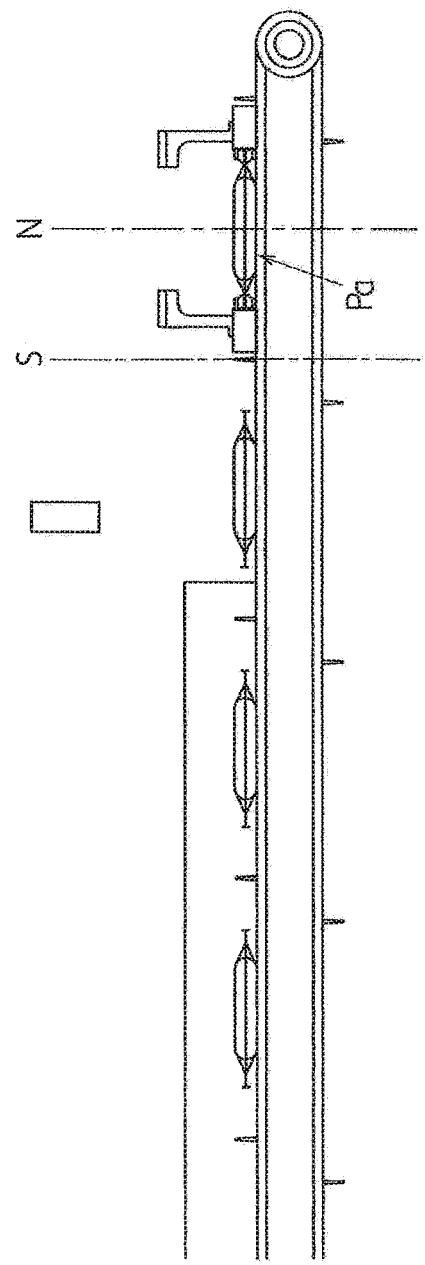
FIG. 13A
FIG. 13B

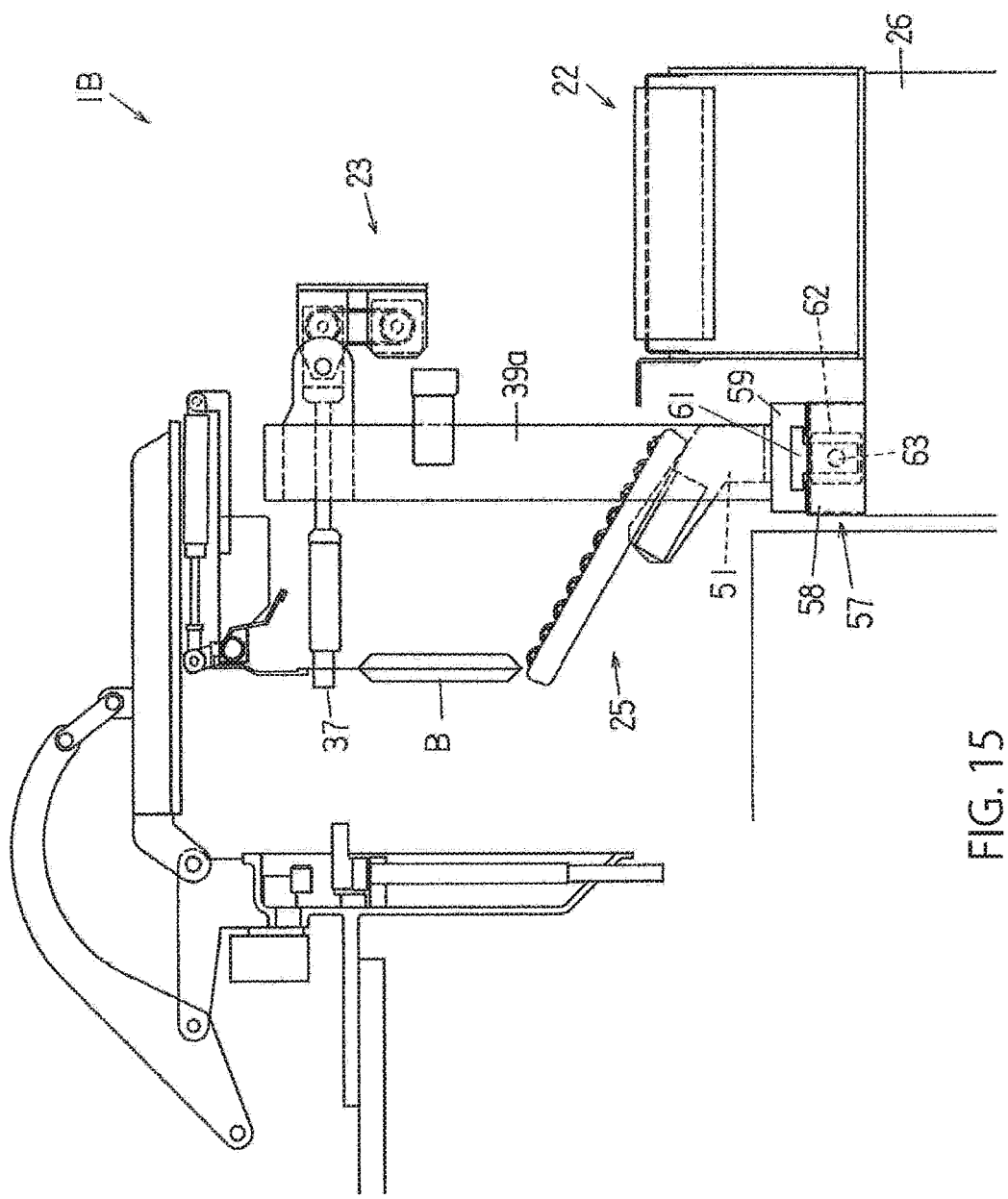

METHOD AND APPARATUS OF SUPPLYING A BAG

CROSS-REFERENCE TO RELATED APPLICATIONS

This application is based upon and claims the benefit of priority from Japanese Patent Application No. 2017-102866 filed on May 24, 2017 and Japanese Patent Application No. 2017-240945 filed on Dec. 15, 2017; the entire contents of which are incorporated herein by reference.

TECHNICAL FIELD

The present invention is directed to a method and an apparatus of supplying bags, each of which is filled with a solid material and having an unsealed bag opening, to a packaging machine one after another and the packaging machine carries out one or more additional packaging process.

BACKGROUND ART

Japanese patent application publication No. 2002-308224 discloses a method and an apparatus for supplying bags each of which is filled with a solid material and has an unsealed bag opening, to a packaging machine for carrying out other packaging processes (such as filling of a liquid material, a decompression processing, and sealing of the bag opening) one after another.

According to these supplying method and apparatus, a bag which is filled with a solid material and which has an unsealed bag opening is placed on a belt conveyor; the bag with a horizontal posture is intermittently conveyed while the bag opening faces forward; the bag is stopped at a stop position (a takeoff position) provided on the conveyance path; the both side edges of the bag near the bag opening are held by a pair of holding members after positioning of the bag is carried out at the stop position by causing guide members (a pair of guide members) to contact the both side edges of the bag from the both sides; and then the posture of the bag is changed from the horizontal posture to a vertical posture while the bag is moved along a predetermined transfer pathway to a delivery position. The bag of which the posture has been changed to the vertical posture is delivered to a pair of grippers of the packaging machine via a bag delivery device.

The pair of guide members has a function in which the pair of guide members contacts the both side edges of a bag from the both sides, and if the bag deviates from a proper position (being a position at which the bag is to be situated), the pair of guide members moves the bag in the width direction, in such a manner that the center of the width of the bag corresponds to the center of the pair of holding members (that is, the bag is positioned). With this, symmetric parts of the both side edges of the bag are evenly held by the pair of holding members, and when this bag is delivered to a pair of grippers of the packaging machine by means of the bag delivery device, the center of the width of the bag can correspond to the center of the pair of grippers.

SUMMARY OF INVENTION

Technical Problem

In a case where the thickness of the front and rear films forming a bag is relatively large and the rigidity of the bag itself is high, the positioning method using a pair of guide members disclosed in Japanese patent application publication No. 2002-308224 can be effectively carried out. However, in a case where the thickness of the films is relatively small and the rigidity of the bag itself is low, this positioning method cannot be properly carried out. This is because when the guide members contact side edges of a bag, the films are vertically curved at the soft side edges and parts adjacent thereto of the bag, the bag becoming heavy due to filling of a solid material cannot move smoothly in the width direction. In such a case, a pair of holding members cannot evenly hold symmetric parts of the both side edges of a bag, it might be difficult to ensure a sufficiently large holding part in one of the both side edges of a bag, and the side edges might be vertically curved and might be held in a curved state.

If a pair of guide members cannot properly carry out positioning of a bag, the side edges of the bag cannot be evenly held by a pair of holding members, and a bag is not supplied reliably and stably to grippers of a packaging machine.

The present invention has been contrived in light of the above-described problems caused by the conventional techniques, an object thereof is to provide a technique which can properly carry out positioning of a bag which is filled with a solid material and has an unsealed bag opening, regardless of the thickness and rigidity of films forming the bag, so that the both side edges of the bag can be evenly held by a pair of holding members and the bag can be supplied reliably and stably to a gripper of a packaging machine.

Solution to Problem

One aspect of the present invention is directed to a method of supplying a bag, comprising the steps of: placing a bag on a conveyance means, the bag being filled with a solid material and having an unsealed bag opening; conveying the bag in a substantial width direction of the bag along a predetermined conveyance path while keeping the bag in a substantially horizontal posture; and causing a pair of holding members to hold both side edges of a part in a neighborhood of the bag opening of the bag at a takeoff position set on the conveyance path, and subsequently causing the pair of holding members to transfer the bag to a delivery position along a predetermined transfer pathway, wherein: one vertical plane perpendicular to the conveyance path is set as a reference plane, an interval of the pair of holding members holding the both side edges of the bag which has been conveyed to the takeoff position is adjusted to correspond to a bag width which is in a direction parallel to the conveyance path and which is detected at a part in a neighborhood of the bag opening of the bag, and both a center of the bag width of the bag which has been conveyed to the takeoff position and a center of the pair of holding members holding the both side edges of the bag are situated on the reference plane. The above-mentioned "bag width" means an apparent bag width measured in a direction parallel to the conveyance path in a planar view of a bag, and in many cases, the above-mentioned "bag width" is smaller than a nominal width of the bag (i.e., a nominal width of the bag which is filled with a solid material) and varies among bags.

In the above-described method of supplying a bag, an intermittent conveyance may be adopted as the conveyance of a bag carried out by the conveyance means, and a continuous conveyance at a constant speed may be adopted as the conveyance of a bag carried out by the conveyance means. Specific examples based on these operation modes are indicated below.

In a case where an intermittent conveyance is adopted as the conveyance of a bag carried out by the conveyance means, the bag may be halted at the takeoff position, and position information on the bag width (a bag width measure in a direction parallel to the conveyance path) and position information on a center of the bag width may be detected in course of the conveyance performed by the conveyance means. Then, the interval of the pair of holding members holding the both side edges of the bag halting at the takeoff position may be adjusted according to the detected results, an intermittent conveyance distance of the conveyance means may be adjusted in such a manner that the center of the bag width of the bag halting at the takeoff position may be situated on the reference plane.

In a case where a continuous conveyance is adopted as the conveyance of a bag carried out by the conveyance means, the pair of holding members may be able to be transferred in the direction parallel to the conveyance path, and before the bag is conveyed to the takeoff position, the pair of holding members may follow the bag and the interval of the pair of holding members may be gradually narrowed while the holding members are positioned on an upstream side and on a downstream side of the bag respectively. In course of conveyance carried out by the conveyance means, position information on the bag width (bag width measured in the direction parallel to the conveyance path) and position information on a center of the bag width may be detected, a movement speed of the respective holding members following the bag may be adjusted according to the detected results, the interval of the pair of holding members holding the both side edges of the bag which has been conveyed to the takeoff position may be adjusted, and when the bag is conveyed to the takeoff position and the center of the bag width reaches the reference plane, the center of the pair of holding members may be simultaneously situated on the reference plane. Further, when the center of the bag width reaches the reference plane, the pair of holding members may be closed and may hold both side edges of the bag.

As one specific operation mode of this kind of continuous conveyance, it is possible that, when the center of the bag width reaches the reference plane, the movement of the pair of holding members in the direction parallel to the conveyance path is halted. As another operation mode, after the bag reaches the takeoff position and until the center of the bag width reaches a position which is set to be distanced from the reference plane on a downstream side by a predetermined distance, the pair of holding members may be transferred at a same speed as the bag.

In the above-described methods of supplying a bag, the following specific preferable modes may be further adopted:

(1) While the bag is transferred on the transfer pathway or after the bag reaches the delivery position, the interval of the pair of holding members is enlarged and the bag opening of the bag is strained.

(2) In a case of item (1) above, the interval of the pair of holding members is enlarged depending on a nominal width of the bag.

(3) In a case of item (1) above, a degree of tension of the bag is detected when the interval of the pair of holding members is enlarged, and the interval of the pair of holding members is adjusted according to this detected result.

(4) The pair of holding members are caused to swing around an axis perpendicular to the reference plane within a range of approximately 90 degrees, and in the course of the bag is transferred from the takeoff position to the delivery position, the posture of the bag is changed from a substantially horizontal posture to a substantially vertical posture.

In the above methods of supplying a bag, the following specific modes may be additionally adopted.

(5) An inclination angle of the bag with respect to the conveyance path is detected in the course of conveyance carried out by the conveyance means, the interval of the holding members holding the both side edges of the bag having been conveyed to the takeoff position is adjusted to correspond to a bag width in a direction parallel to the width direction of the bag calculated based on the inclination angle and the bag width (the bag width measured in a direction parallel to the conveyance path), an alignment direction of the pair of holding members with respect to the conveyance path is adjusted based on the inclination angle, and thereby the alignment direction of the pair of holding members holding the both side edges of the bag conveyed to the takeoff position is parallel to the width direction of the bag. After that, the alignment direction of the pair of holding members is returned to an original condition on the transfer pathway. In concrete terms, the "width direction of the bag" is generally a direction along the edge of the bag opening, and when the bag is oblique to the conveyance path, the "bag width in the direction parallel to the width direction of the bag" is smaller than the "bag width measured in the direction parallel to the conveyance path".

By adopting this specific mode, even when a bag in an inclined condition (that is, in a condition where the width direction of the bag is oblique to the conveyance path) is placed on the conveyance means, positions in the longitudinal direction where the pair of holding members holds both side edges of the bag (positions from the bag opening edge to the holding positions) can be aligned between the both side edges.

Another aspect of the present invention is directed to an apparatus of supplying a bag (in which the conveyance means is an intermittent conveyance type), comprising: a conveyance means on which a bag being filled with a solid material and having an unsealed bag opening is placed and which intermittently conveys the bag in a substantial width direction of the bag along a predetermined conveyance path while keeping the bag in a substantially horizontal posture; and a pair of holding members which holds both side edges of a part in a neighborhood of the bag opening of the bag at a takeoff position set on the conveyance path and is transferred to a delivery position along a predetermined transfer pathway, wherein: one vertical plane perpendicular to the conveyance path is set as a reference plane, the conveyance means includes a first servo motor serving as a driving source, and the apparatus of supplying a bag further comprises a bag transfer means, a detection means and a control device and the bag transfer means includes the pair of holding members. The bag transfer means further may include: a second servo motor adjusting an interval of the pair of holding members; and a reciprocating transfer mechanism which transfers the pair of holding members back and forth between the takeoff position and the delivery position, and a center of the pair of holding members may be situated on the reference plane at the takeoff position. The detection means may be provided on an upstream side of the conveyance path with respect to the takeoff position and may detect position information on a bag width in a direction parallel to the conveyance path at a part in a neighborhood of the bag opening of the bag conveyed by the conveyance means and position information on a center of the bag width. The control device may control the first servo motor according to the position information on the center of the bag width detected by the detection means so as to adjust an intermittent conveyance distance of the conveyance means in such a manner that the center of the bag width of the bag which halts at the takeoff position is situated on the reference plane, and may control the second servo motor according to the detected bag width so as to adjust the interval of the pair of holding members at the takeoff position to correspond the bag width.

Another aspect of the present invention is directed to an apparatus of supplying a bag (in which the conveyance means is a continuous conveyance type, a first type), comprising: a conveyance means on which a bag being filled with a solid material and having an unsealed bag opening is placed, and which continuously conveys the bag at a constant speed in a substantial width direction of the bag along a predetermined conveyance path while keeping the bag in a substantially horizontal posture; and a pair of holding members which holds both side edges of a part in a neighborhood of the bag opening of the bag at a takeoff position set on the conveyance path and is transferred to a delivery position along a predetermined transfer pathway, wherein: one vertical plane perpendicular to the conveyance path is set as a reference plane, the conveyance means includes a first servo motor serving as a driving source, and the apparatus of supplying a bag further comprises a bag transfer means, a detection means and a control device and the bag transfer means includes the pair of holding members. The bag transfer means may further include: two second servo motors which are able to independently transfer the holding members in a direction parallel to the conveyance path; and a reciprocating transfer mechanism which transfers the pair of holding members back and forth between the takeoff position and the delivery position. The detection means may be provided on an upstream side of the conveyance path with respect to the takeoff position and may detect position information on a bag width in the direction parallel to the conveyance path at a part in a neighborhood of the bag opening of the bag conveyed by the conveyance means and position information on a center of the bag width. The control device may control the two second servo motors according to the position information on the bag width and the position information on the center of the bag width detected by the detection means in such a manner that, before the bag is conveyed to and reaches the takeoff position, the pair of holding members follows the bag and the interval of the pair of holding members is gradually narrowed while the holding members are positioned on an upstream side and on a downstream side of the bag respectively, and when the bag is conveyed to the takeoff position and the center of the bag width reaches the reference plane, the center of the pair of holding members is situated on the reference plane and the interval of the pair of holding members corresponds to the bag width. Further, when the center of the apparent width of the bag reaches the reference plane, the pair of holding members is closed and the both side edges of the bag are held.

Another aspect of the present invention is directed to an apparatus of supplying a bag (in which the conveyance means is a continuous conveyance type, a second type), and this apparatus is different from the above-described apparatus of supplying a bag (a continuous conveyance type, a first type) in that: the bag transfer means includes a second servo motor (one second servo motor) adjusting the interval of the pair of holding members; and a following transfer mechanism is provided, and the following transfer mechanism transfers the bag transfer means back and forth in a direction parallel to the conveyance path of the conveyance means and includes a third servo motor serving as a driving source. The second and third servo motors included in this apparatus of supplying a bag fulfill functions similar to the two second servo motors included in the apparatus of supplying a bag (a continuous conveyance type, a first type).

As functions of the control device of said apparatuses of supplying a bag (a continuous type, a first type, a second type), when the bag is conveyed to the takeoff position and the center of the bag width (bag width measured in a direction parallel to the conveyance path) reaches the reference plane, the control device may cause the pair of holding members to halt in the direction parallel to the conveyance path. Alternatively, after the bag is conveyed to the takeoff position and until the center of the bag width (bag width measured in a direction parallel to the conveyance path) reaches a position which is set on a downstream side by a predetermined distance from the reference plane, the control device may cause the pair of holding members to be transferred at a same speed as the bag.

The above-described apparatuses of supplying a bag may further adopt the following specific modes.

(1) While the pair of holding members is transferred in the transfer pathway or after the pair of holding members reaches the delivery position, the control device operates the second servo motor to enlarge the interval of the pair of holding members according to a nominal width of the bag and strain the bag opening of the bag.

(2) The torque detection means which detects torque applied to the second servo motor is installed; while the pair of holding members transfers the bag from the takeoff position to the delivery position or after the pair of holding members reaches the delivery position, the control device operates the second servo motor to enlarge the interval of the pair of holding members and strain the bag opening of the bag; and the torque detected by the torque detection means reaches a predetermined value, the control device halts the second servo motor.

(3) The bag transfer means includes swinging arms which swing around an axis perpendicular to the reference plane within a range of approximately 90 degrees, the pair of holding members and the second servo motor are installed with the swinging arms, and in the course of the pair of holding members being transferred from the takeoff position to the delivery position, the posture of the bag is changed from a substantially horizontal posture to a substantially vertical posture.

(4) A bag guide means which guides the bag held by the pair of holding members moving along the transfer pathway is provided, and the bag guide means is positioned below the transfer pathway and along the transfer pathway, and includes a plurality of contact members which contact the bag being transferred. For example, the contact members include a plurality rollers which are each able to rotate around a rotation axis perpendicular to the reference plane.

The above-described apparatuses of supplying a bag may additionally adopt the following preferable specific modes.

(5) in the bag transfer means, the pair of holding members is supported while the pair of holding members is able to swing around an axis which is perpendicular to holding surfaces of the pair of holding members and which passes through the center of the pair of holding members, the bag transfer means includes a fourth servo motor causing the pair of holding members to swing back and forth around the axis, the detection means detects an inclination angle of the bag conveyed by the conveyance means, with respect to the conveyance path, the control device controls the second servo motor so as to adjust the interval of the pair of holding members to correspond to a bag width in a direction parallel to the width direction of the bag calculated based on the inclination angle and the bag width (bag width measured in a direction parallel to the conveyance path), and controls the fourth servo motor according to the inclination angle in such a manner that a direction of alignment of the pair of holding members is parallel to the width direction of the bag at the takeoff position, and the direction of alignment of the pair of holding members is returned to an original condition on the transfer pathway.

By adopting this specific mode, even when a bag in an inclined condition (that is, in a condition where the width direction of the bag is oblique to the conveyance path) is placed on the conveyance means, positions in the longitudinal direction of both side edges of the bag where the pair of holding members holds (distances from the bag opening edge to the holding positions) can be aligned between the both side edges.

According to methods and apparatuses of supplying a bag related to some embodiments of the present invention, a bag is placed on the conveyance means and is conveyed in a substantial width direction while the bag is kept in a substantially horizontal posture, and when the pair of holding members hold both side edges of the bag at the takeoff position on the conveyance path, the center of the pair of holding members is situated on the reference plane and the center of the bag width of a part in a neighborhood of the bag opening of the bag (the bag width measured in a direction parallel to the conveyance path) is situated on the reference plane. Thus, a contact-type positioning mechanism as described in Japanese patent application publication No. 2002-308224 is unnecessary, and regardless of degree of thickness and rigidity of a film(s) forming a bag, positioning of the bag is suitably carried out at the takeoff position on the conveyance path. Further, the interval of the pair of holding members when the pair of holding members holds both side edges of the bag is adjusted to correspond to the bag width.

Thus, both side edges of the bag can be evenly held by the pair of holding members, and the bag can be supplied to a gripper(s) of a packaging machine in a reliable and stable manner.

BRIEF DESCRIPTION OF DRAWINGS

FIG. 13A is a side view showing one example of the behavior of the transfer means for a bag illustrated in FIG. 12 in chronological order.

FIG. 13B is a side view showing one example of the behavior of the transfer means for a bag illustrated in FIG. 12 in chronological order.

FIG. 15 is a side view of a supplying device according to yet another embodiment of the present invention.

DESCRIPTION OF EMBODIMENTS

Next, with reference to FIGS. 1 to 27, methods and apparatuses of supplying bags related to some embodiments of the present invention are described in detail.

[Example in which a Conveyance Unit (Conveyance Means) is Classified as an Intermittent Conveyance Type]

Figure 1:
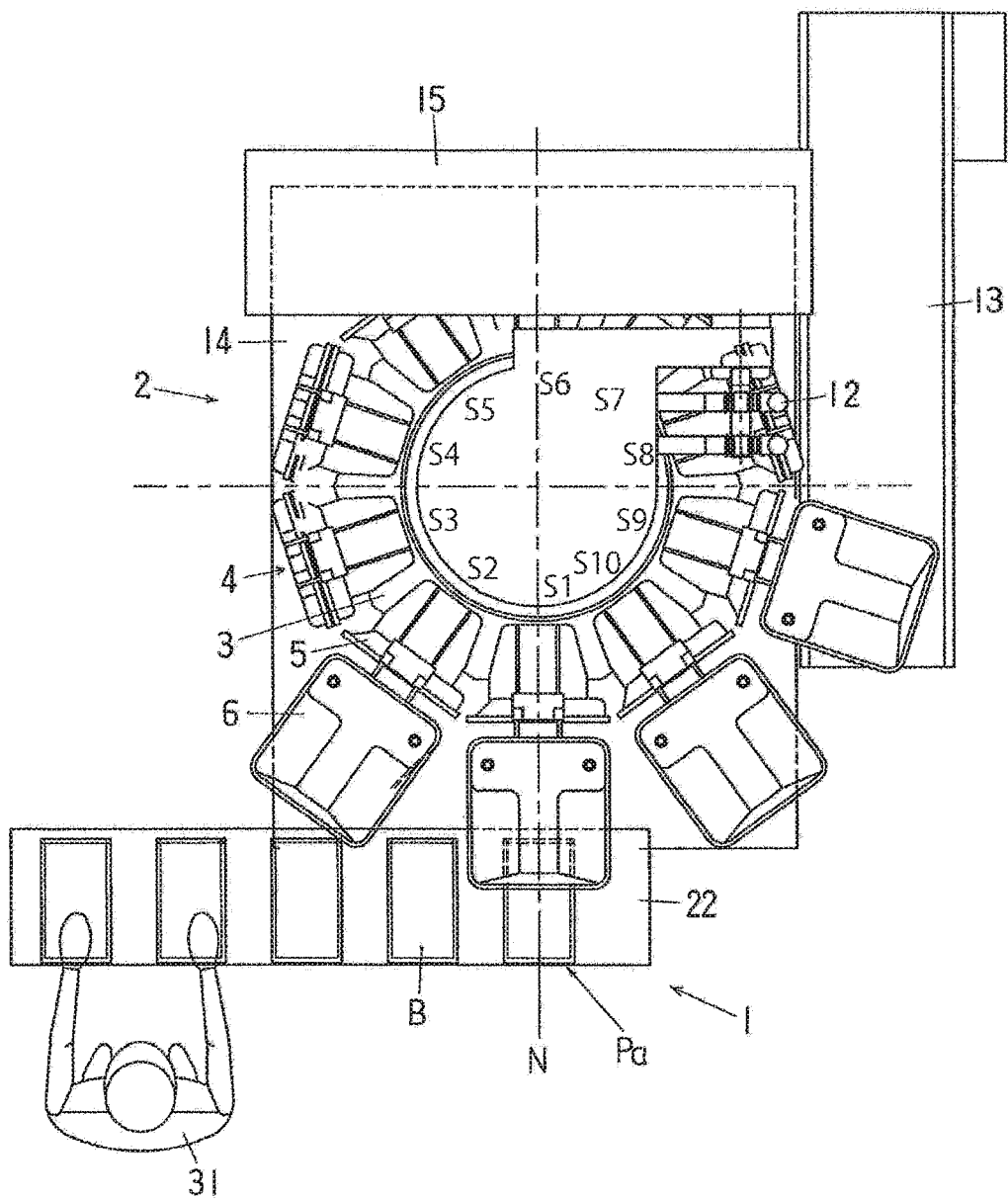
FIG. 1 is a top view of a supplying device for bags and a packaging machine according to an embodiment of the present invention.
Figure 2:
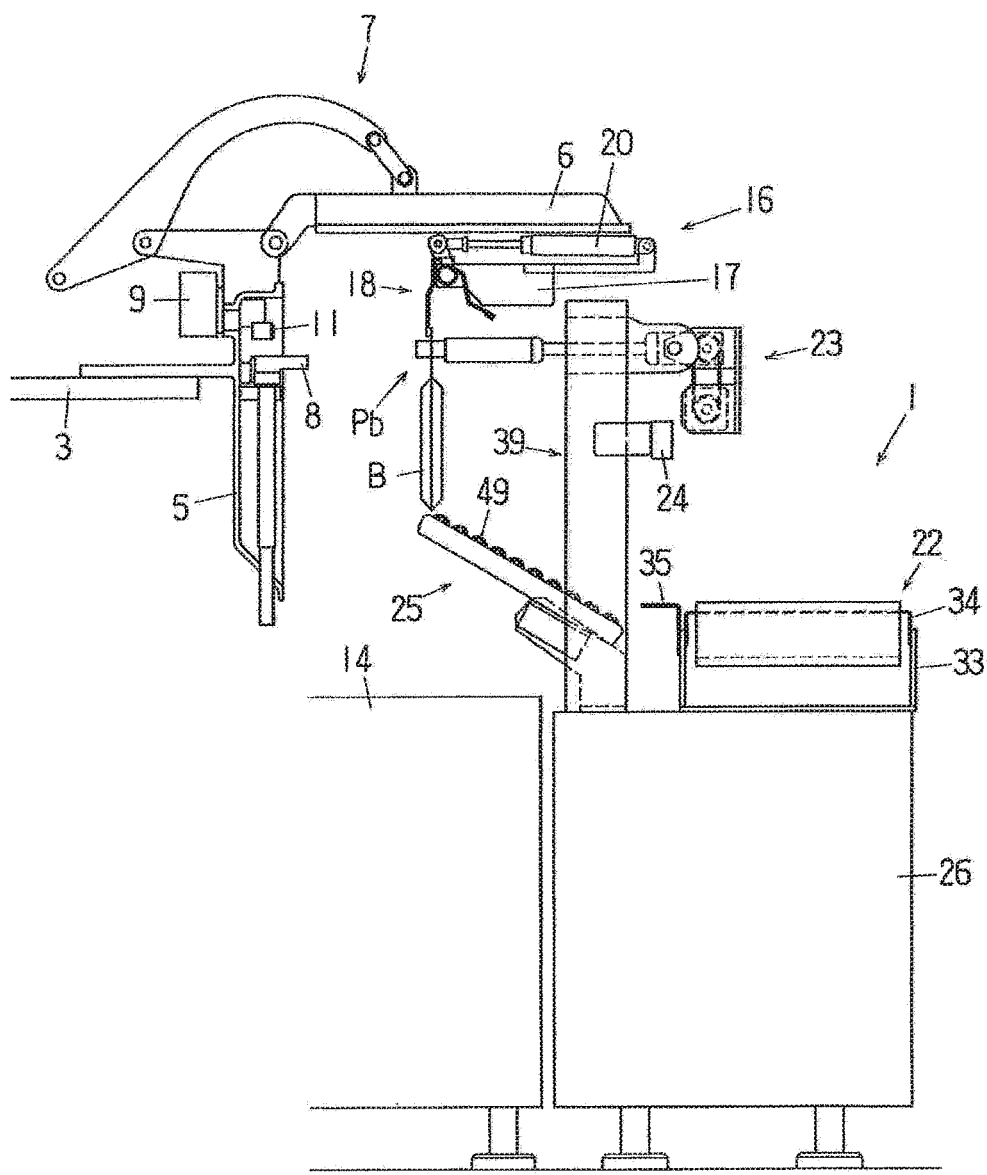
FIG. 2 is a side view of the supplying device and the packaging machine illustrated in FIG. 1.

FIGS. 1-11 illustrate one embodiment (an intermittent conveyance type) of a method and an apparatus of supplying bags related to the present invention. As shown in FIGS. 1 and 2, a supplying device 1 for bags is installed in a neighborhood of a vacuum packaging machine 2.

Similarly to an apparatus disclosed in Japanese patent application publication No. 2013-244967 for example, the vacuum packaging machine 2 comprises: a table 3 intermittently rotating (that is, rotating in the clockwise direction in FIG. 1) so as to repeat rotation and stop in a constant tempo; and a plurality of vacuum chambers 4 (in this example, ten chambers) installed on the periphery of the table 3 at equal angular interval. Each vacuum chamber 4 includes: a chamber body 5 fixed to the table 3; and a chamber cover 6 installed so as to be able to open and close the chamber body 5.

The chamber bodies 5 are provided on the periphery of the table 3 at even intervals while the openings of the respective chamber bodies 5 are oriented toward the outside direction in a radial fashion. Similar to Japanese patent application publication No. 2013-244967, a chamber cover 6 performs an opening action and a closing action with respect to the opening of a chamber body 5 by means of an opening-closing mechanism 7 (see FIG. 2), and when the closing action has been carried out, the chamber cover 6 closely adheres to the periphery edge part of the opening of the chamber body 5 so as to form a vacuum chamber 4 together with the chamber body 5. As shown in FIG. 2, grippers 8 and a sealing device are installed inside a vacuum chamber 4, the grippers 8 are provided to grip parts of a bag B slightly below the sealing plan part (for details, see Japanese patent No. 2538473 for example), and the sealing device is formed by a receiving board 11 (located on the chamber body 5 side) which is moved forward and rearward by means of an air cylinder 9 and a heater (located on the chamber cover 6 side) which is not illustrated The chamber body 5 is connected to a vacuum pipe (a part of the vacuum pipe is denoted by reference numeral "12" in FIG. 1) which is connected to a changeover valve and a vacuum pump functioning as a decompression mechanism, and a packing (not illustrated) is provided onto the entire circumference of the closely attached part between a chamber body 5 and a chamber cover 6 (the opening periphery edge part of a chamber cover 6).

A vacuum chamber 4 is intermittently moved on a horizontal circular transfer path with the intermittent rotation of the table 3 (in FIG. 1, reference numerals S1 to S10 indicated above the table 3 denote the stop positions), and during one rotation of the table 3, various kinds of packaging processing steps, such as a step of receiving a bag B having been filled with a solid material and having an unsealed bag opening (e.g., a step of gripping a bag B by using grippers 8), a step of performing closing using a chamber cover 6, a step of performing decompression inside a vacuum chamber 4, and a step of sealing a bag opening, are carried out one after another. After a bag opening is sealed, the pressure inside a vacuum chamber 4 is adjusted to be an atmospheric pressure, the opening action of a chamber cover 6 is performed, and grippers 8 are opened so that a bag B falls onto a conveyor 13 and the bag B is transferred outside the machine. In FIGS. 1 and 2, reference numeral "14" denotes a mounting table of the vacuum packaging machine 2, and reference numeral "15" denotes a control device for controlling actions of the supplying device 1 for supplying bags, actions of the vacuum packaging machine 2 and actions of other devices.

As illustrated in FIG. 2, a delivery device 16 for delivering a bag is provided between the vacuum packaging machine 2 and the supplying device 1. The delivery device 16 receives a bag B from the supplying device 1, transfers this bag B in the horizontal direction, and delivers this bag B to grippers 8 of the vacuum packaging machine 2, and the delivery device 16 includes: a slide member 17 which is linearly reciprocated a predetermined distance in a horizontal plane by means of a driving source (not illustrated); and a chuck 18 which is provided with the slide member 17. The chuck 18 includes: a stationary side chuck 18a fixed to the slide member 17; and a movable side chuck 18b fixed to a shaft 19 which is ratably supported by the slide member 17 (see FIG. 5). The delivery device 16 further includes an air cylinder 20 installed with the slide member 17, and the leading end of a piston rod 20a of the air cylinder 20 is connected to a lever 21 attached to the shaft 19. When the air cylinder 20 is operated (that is, the piston rod 20a is extended or shortened), the chuck 18 opens and closes; and when the slide member 17 reciprocates, the chuck 18 reciprocates, along a horizontal linear transfer pathway (which is also a transfer pathway of a bag B held by the chuck 18), between a standby position (indicated by a solid line in FIG. 11) and an advance position (indicated by a chain double-dashed line in FIG. 11).

The supplying device 1 includes a conveyance means (conveyance means; a belt conveyor 22), a bag transfer means (bag transfer unit) 23, a detection means (detection unit; a sensor 24), a bag guide means (bag guide unit) 25, and said control device 15.

Figure 3:
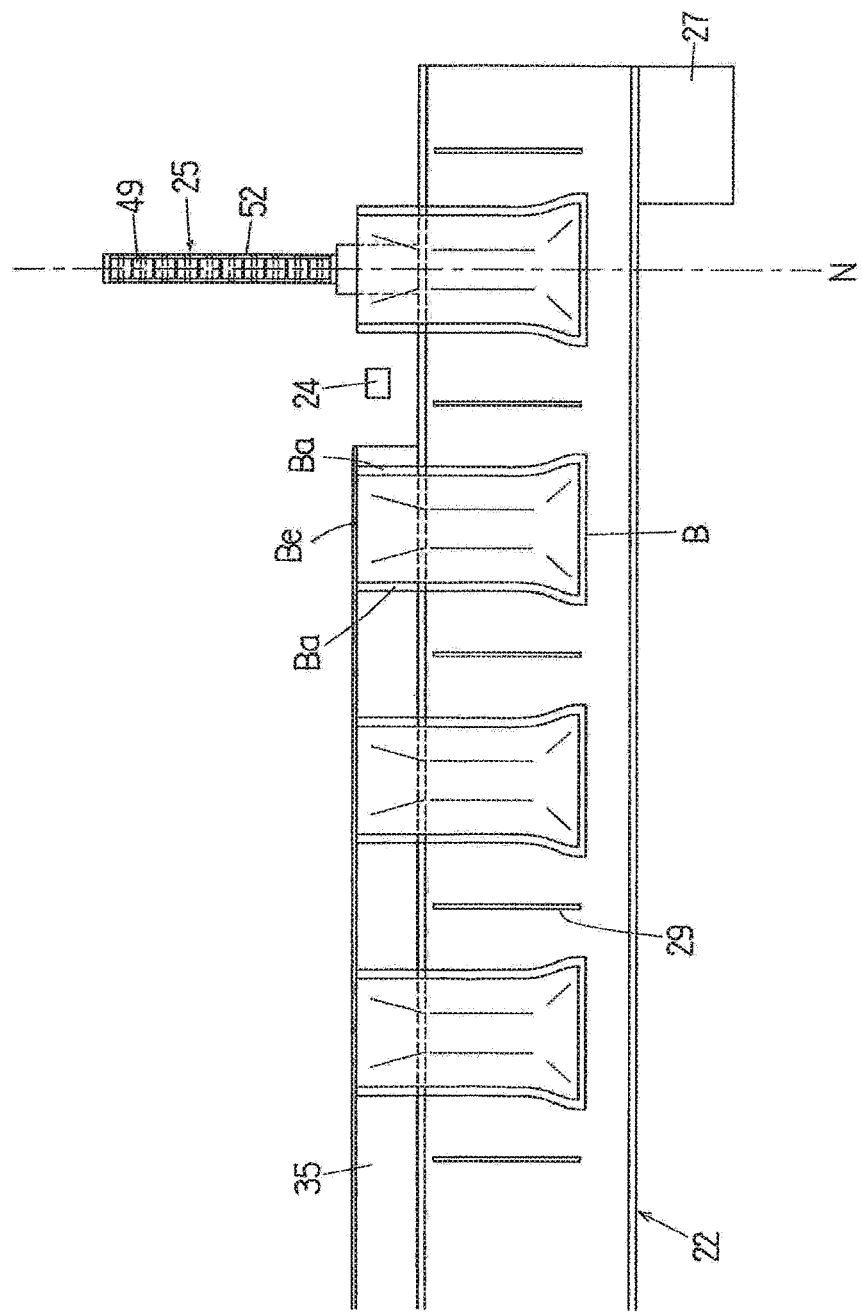
FIG. 3 is a top view of a belt conveyor and a bag guide means of the supplying device illustrated in FIG. 1.

The belt conveyor 22 is installed on the mounting table 26, has a horizontal conveyance surface, and is driven by a driving source (a first servo motor 27) shown in FIG. 3 to intermittently convey an object to be conveyed (that is, a bag B) along a linear conveyance path. Partition plates 29 (see FIGS. 3 and 4) are fixed, at even intervals (each interval is basically equal to the distance of one intermittent conveyance), to the surface of the belt 28 of the belt conveyor 22. In FIG. 1, the belt conveyor 22 is in a halt condition, and bags B are placed on the belt conveyor 22 at approximately equal intervals. Empty bags are each filled with a solid material 32 (see FIG. 4) by a worker 31 and then those bags B are placed on the belt conveyor 22, and the partition plates 29 serve as the landmarks for the places on which bags B should be placed. The bag openings of bags B placed on the belt conveyor 22 are not sealed, the bag openings are oriented toward the vacuum packaging machine 2, the width direction (which is a direction along the bag opening end edge Be or a direction perpendicular to the side edge part Ba of the bags) is approximately parallel to the conveyance direction of the belt conveyor 22, and the leading end (which is a neighborhood of the bag opening) protrudes outside the belt 28 as shown in FIG. 3. In this example, a final stop position on the belt conveyor 22 for bags B is set as a bag takeoff position (which is a position where both side edges Ba, Ba of a bag B is gripped by a pair of holding members 37, 37 described later of the bag transfer means 23). The takeoff position for bags B is denoted by sign "Pa" in FIG. 1.

The receiving board 34 and a support plate 35 are installed on a frame 33 of the belt conveyor 22, the receiving board 34 keeps the belt 28 (upper surface side) in a horizontal posture, and the support plate 35 supports the leading ends (a neighborhood of the bag openings) of bags B protruding outside the belt 28.

In the supplying device 1, one vertical plane is set as a reference plane N (see FIG. 1), and the conveyance path of the belt conveyor 22 is perpendicular to the reference plane N.

Figure 4:
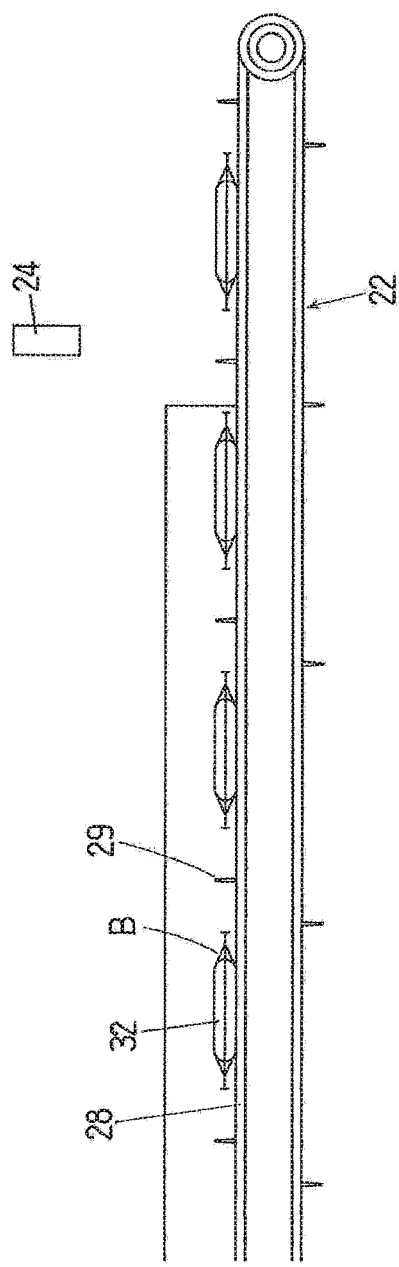
FIG. 4 is a front view of the belt conveyor of the supplying device illustrated in FIG. 1.

In this example, as shown in FIGS. 3 and 4 in particular, a sensor 24 is installed between a final stop position (bag takeoff position Pa) for bags B on the conveyance path and a previous stop position, and has functions to determine the position information on the bag width of a part in a neighborhood of the bag opening of a conveyed bag B (which is the bag width measured in a direction parallel to the conveyance path) and the position information on the center of the bag width. More specifically, the sensor 24 detects the fact that the forward side edge Ba of a bag B enters the detection position (which is a position directly below the sensor 24) (i.e., detection signal ON) and the fact that the backward side edge Ba has passed the detection position (i.e., detection signal OFF), and the control device 15 calculates (determines) the position information on each of the bag width and the center thereof on the basis of those detection signals and the rotation positions of the first servo motor 27 at the time of the detection signal ON/OFF. The bag width of a bag B determined by the sensor 24 is referred to as a determined bag width hereinafter.

The determined bag width of a bag B is an apparent bag width (which is a bag width in a planar view of the bag B), and similarly the center of the determined bag width is the center of the apparent bag width. A bag B which has been filled with a solid material 32 bulges in the thickness direction, the apparent bag width is smaller than a nominal width (which is a nominal width of a bag which has not been filled with a solid material) and tends to vary with respect to each bag, and therefore it is necessary to determine the position information on the apparent bag width of a bag B and its center with respect to each bag.

The control device 15 calculates the distance from the center to the reference plane N according to the position information on the center of the determined bag width of a bag B (which is a bag width measured in a direction parallel to the conveyance path), and controls the first servo motor 27 according to the calculated distance so as to adjust the intermittent conveyance distance of the belt conveyor 22 in such a manner that the center of the determined bag width of the bag B which stops at the takeoff position Pa is located on the reference plane N. For example, a photoelectric sensor or a CCD (Charge-Coupled Device) imaging sensor may be used for the sensor 24.

Figure 5:
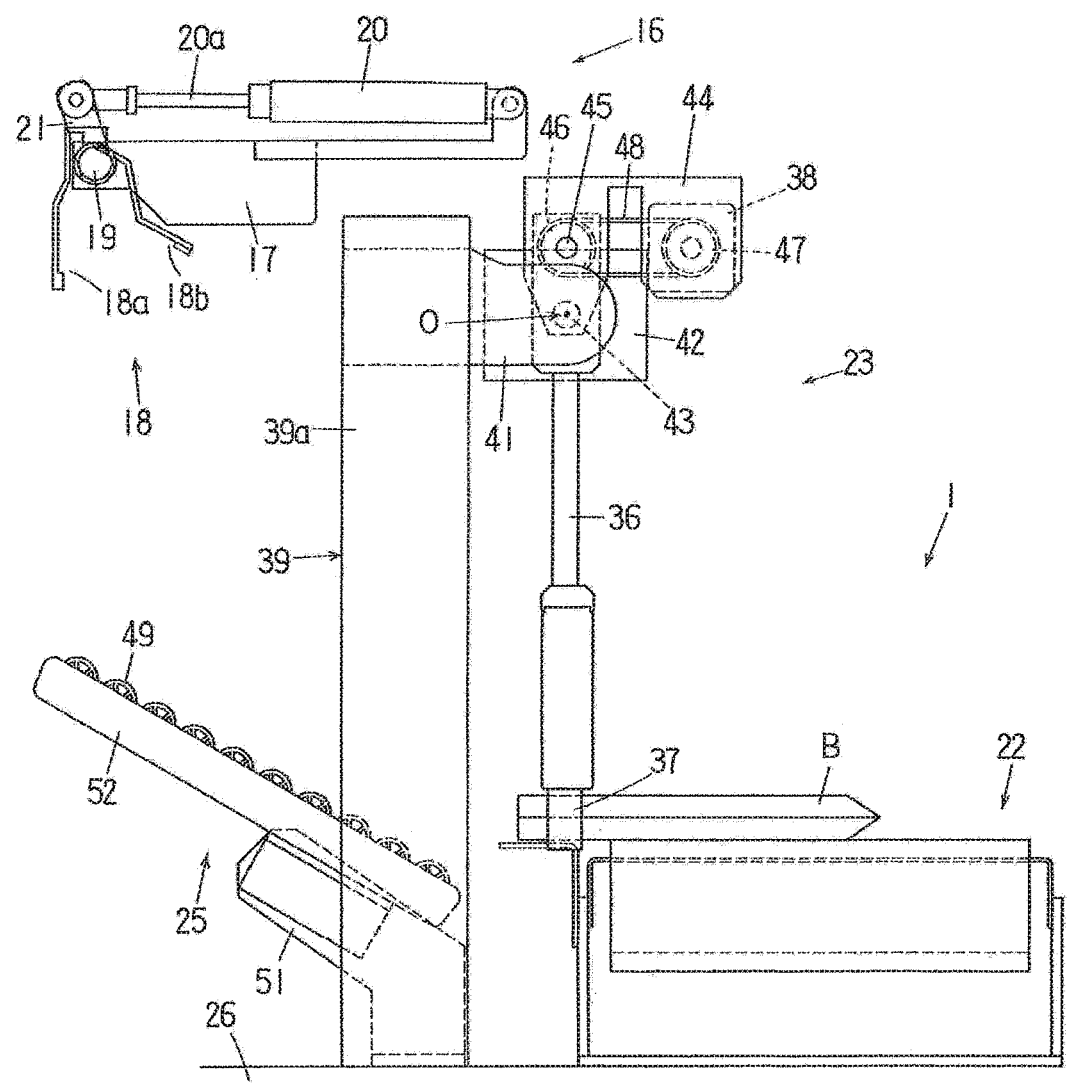
FIG. 5 is a side view of the supplying device illustrated in FIG. 1.
Figure 6:
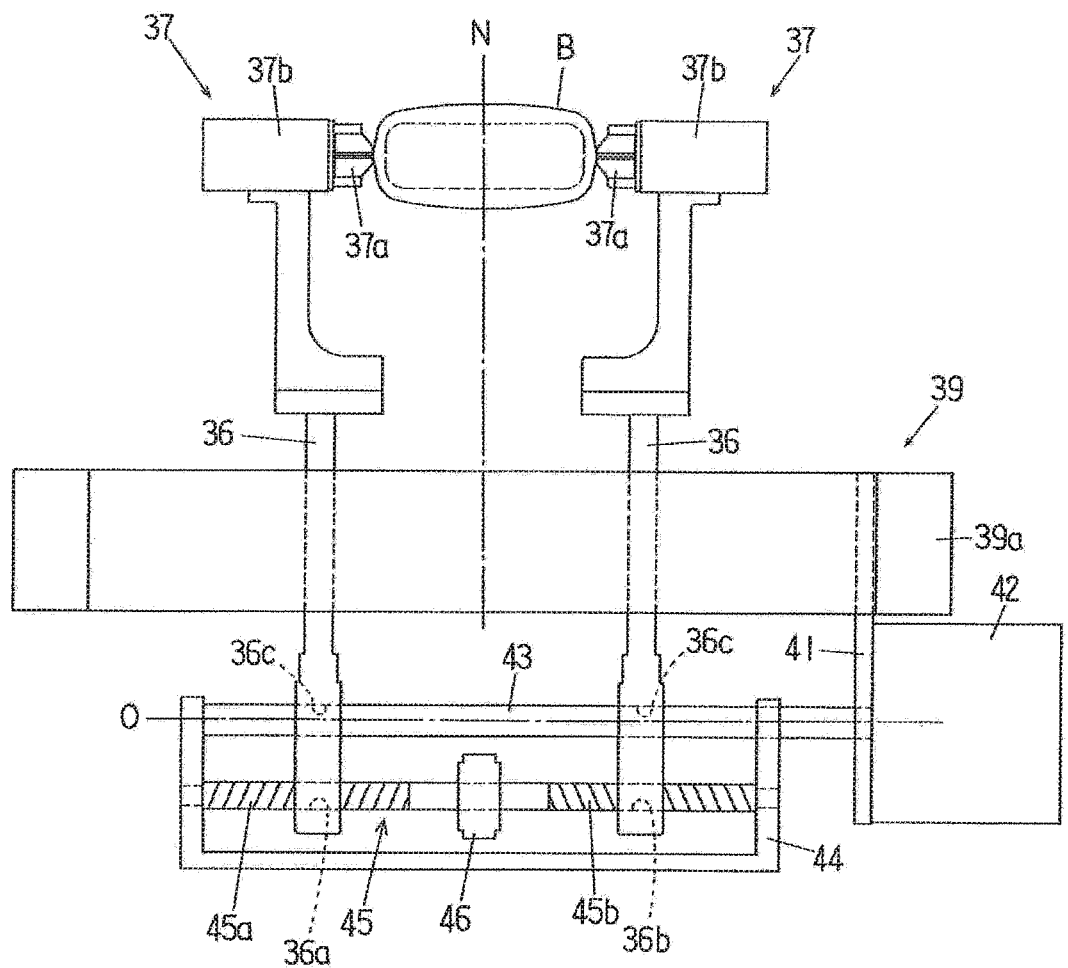
FIG. 6 is a top view of a transfer means for a bag of the supplying device illustrated in FIG. 1 (in which the interval of a pair of holding members is small).

The bag transfer means 23 transfers a bag B from the takeoff position Pa on the conveyance path to the delivery position Pb (the position at which a bag B is gripped by a chuck 18 of the bag delivery device 16), and, as shown in FIGS. 5 and 6 in particular, comprises a pair of swinging arms 36, 36 which swings in a range of substantially 90° around an axis O perpendicular to the reference plane N; holding members 37 which are installed on the leading ends of the swinging arms 36 respectively; and a second servo motor 38 which enlarges or reduces the interval of the pair of swinging arms 36, 36 (and the interval of the pair of holding members 37, 37). The alignment direction of the pair of holding members 37, 37 (i.e., the direction of alignment of the holding members 37, 37) is parallel to the conveyance path.

Regarding the specific configuration of the bag transfer means 23, a stand 39 of a gate type is installed on the mounting table 26, a reciprocating driving motor 42 is fixed to a bracket 41 installed on a leg 39a of the stand 39, a frame 44 is fixed to the rotation shaft 43 (of which the center corresponds to the axis O) of this reciprocating driving motor 42, and both ends of a threaded shaft 45 are rotatably supported by the frame 44. Right and left parts of the threaded shaft 45 respectively have screw parts 45a, 45b having thread cuttings which have opposite directions to each other, and a pulley 46 is fixed to the center part of the threaded shaft 45. Further, the second servo motor 38 is installed on the frame 44, and a belt 48 is supported by and strained between the pulley 46 and a driving pulley 47 fixed to the rotation shaft of the second servo motor 38.

Figure 7:
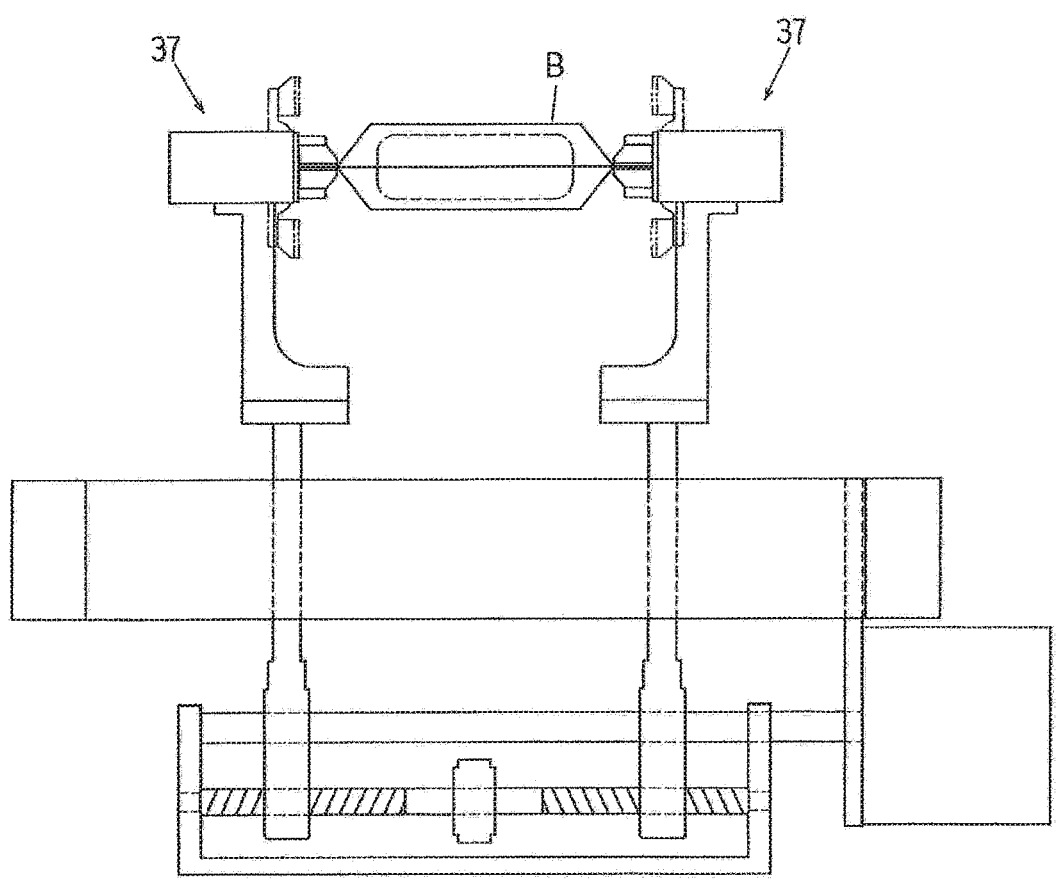
FIG. 7 is a top view of the transfer means for a bag of the supplying device illustrated in FIG. 1 (in which the interval of a pair of holding members is large).

The base part of each swinging arm 36 includes: a female screw part 36a (36b) which screws to a screw part 45a (45b) of the threaded shaft 45; and a bore 36c through which the rotation shaft 43 of the reciprocating driving motor 42 penetrates, and the holding members 37, 37 are provided on the leading ends of the swinging arms 36 respectively. Each holding member 37 has an air cylinder 37b causing holding parts 37a, 37a of a double door type to open and close. The holding parts 37a being in a closed state are illustrated in FIGS. 6 and 7 with a solid line, and the holding parts 37a being in an open state are illustrated in FIG. 7 with a chain double-dashed line.

When the second servo motor 38 is operated, the pair of swinging arms 36, 36 comes close to each other or moves away from each other in a symmetric fashion while the reference plane N is situated between the swinging arms 36, 36, and accordingly, the pair of holding members 37, 37 comes close to each other or moves away from each other in a symmetric fashion (in a direction parallel to the conveyance path) while the reference plane N is situated between the holding members 37, 37 (that is, the interval of the pair of holding members 37, 37 is shortened or enlarged).

The rotation axis 43 is rotated within an angular range of 90 degrees in a reciprocating manner by the reciprocating driving motor 42. Accordingly, the pair of swinging arms 36, 36 swings around the axis O, within an angular range of 90 degrees, between a vertical posture (see FIG. 5) and a horizontal posture (see FIG. 2), so that the holding members 37, installed on the leading ends of the swinging arms 36 respectively, also swing around the axis O within an angular range of 90 degrees between the takeoff position Pa and the delivery position Pb. The holding surfaces of the holding members 37 are placed in a horizontal state at the takeoff position Pa and are placed in a vertical state at the delivery position. When the pair of holding members 37, 37 moves from the takeoff position Pa to the delivery position Pb, the trajectory of the center of the pair of holding members 37, 37 (i.e., the transfer pathway of the pair of holding members 37, 37) is always situated on the reference plane N.

The takeoff position Pa is a position of a bag B on the conveyance path, and at the same time, is also a position of the pair of holding members 37, 37 on the transfer pathway (i.e., a position for holding a bag B). Further, the delivery position Pb is a position of a bag B on the transfer pathway, and at the same time, is also a position of the pair of holding members 37, 37 on the transfer pathway.

The control device 15 controls the second servo motor 38 according to the determined bag width of a bag B (the bag width measured in a direction parallel to the conveyance path) in such a manner that the interval of the pair of holding members 37, 37 positioned at the takeoff position Pa is adjusted corresponding to the determined bag width of the bag B (so that the larger the determined bag width of the bag B is, the larger the interval of the pair of holding members 37, 37 becomes) and the pair of holding members 37, 37 can symmetrically hold proper positions of both side edges Ba, Ba of the bag B.

Further, the control device 15 controls the second servo motor 38 in such a manner that, while the pair of holding members 37, 37 (and a bag B) is transferred along the transfer pathway from the takeoff position Pa to the delivery position Pb or after the pair of holding members 37, 37 (and a bag B) arrives at the delivery position Pb, the interval of the pair of holding members 37, 37 is enlarged on the basis of the nominal width of the bag B so as to strain the bag opening of the bag B. FIG. 7 shows a state where the interval of the pair of holding members 37, 37 is enlarged at the delivery position Pb and the bag opening of a bag B is strained to be in a closed state.

The bag guide means 25 has contact members which are arranged below and along the transfer pathway for the pair of holding members 37, 37 (this transfer pathway is also a transfer pathway for a bag B), and a bag B may contact the contact members. As illustrated in FIGS. 2, 3 and 5, these contact members include a plurality of rollers 49 which are each provided so as to be able to rotate around a rotation axis perpendicular to the reference plane N. A support table 51 is installed on the mounting table 26, a frame 52 is installed on the support table 51, and the plurality of rollers 49 are installed on this frame 52 so as to be placed in a row along the transfer pathway.

While a bag B of which both side edges are held by the pair of holding members 37, 37 is transferred along the transfer pathway from the takeoff position Pa, which is located on the conveyance path of the belt conveyor 22, towards the delivery position Pb, the bag B comes into contact with the rollers 49 (see FIG. 9), and thus wiggling of the bag B is avoided during the transfer and therefore the bag B can be delivered to the delivery device 16 reliably and stably.

Next, one example of an operation mode of the above-described supplying device 1, the delivery device 16 and the vacuum packaging machine 2 (in particular, an operation mode of the supplying device 1) is further described in chronological order with reference to FIGS. 8 to 11.

(1) As illustrated in FIGS. 1 and 3, a worker 31 fills each bag B with a solid material 32, and then places bags on the belt conveyor 22 at substantially even intervals while the direction of the width of each bag B (i.e., a direction along the bag opening edge Be) is oriented in a direction which is approximately parallel to the conveyance direction of the belt conveyor 22. In this situation, by bringing one side edge Ba of a bag B into contact with the partition plate 29, the width direction of the bag B is accurately oriented in the conveyance direction, and it becomes easy to place bags B on the belt conveyor 22 at even intervals. As illustrated in FIG. 3, the upper part of each bag B (i.e., a part in a neighborhood of the bag opening) protrudes from an edge of the belt 28 and is placed on the support plate 35.

(2) The position information on the width (the determined bag width) of a part in a neighborhood of the bag opening of a bag B conveyed below the sensor 24 (between the final stop position (takeoff position Pa) and the previous stop position on the conveyance path of the belt conveyor 22) and the position information on the center of that width are determined by the sensor 24.

At approximately the same timing, the pair of swinging arms 36, 36 of the bag transfer means 23 starts to swing downward, and the pair of holding members 37, 37 moves towards the takeoff position on the conveyance path of the belt conveyor 22. At that time, the holding parts 37a, 37a of the pair of holding members 37, 37 are placed in an open state.

(3) The control device 15 controls the first servo motor 27 according to the position information on the center of the determined bag width of a bag B so as to adjust the intermittent conveyance distance of the belt conveyor 22 in such a manner that, when the belt conveyor 22 stops next, the center of the determined bag width of the bag B which stops at the takeoff position Pa is situated on the reference plane N (see FIG. 3). In other words, when the center of the determined bag width of the bag B reaches a position on the reference plane N, the belt conveyor 22 is stopped.

Further, the control device 15 controls the second servo motor 38 according to the determined bag width of a bag B in such a manner that the interval of the pair of holding members 37, 37 positioned at the takeoff position is adjusted to correspond to the determined bag width of the bag B. Preferably, the interval of the pair of holding members 37, 37 is adjusted while the pair of holding members 37, 37 is transferred on the transfer pathway towards the takeoff position Pa, and when the pair of holding members 37, 37 arrives at the takeoff position Pa, such adjustment of the interval of the pair of holding members 37, 37 has been completed.

Figure 8:
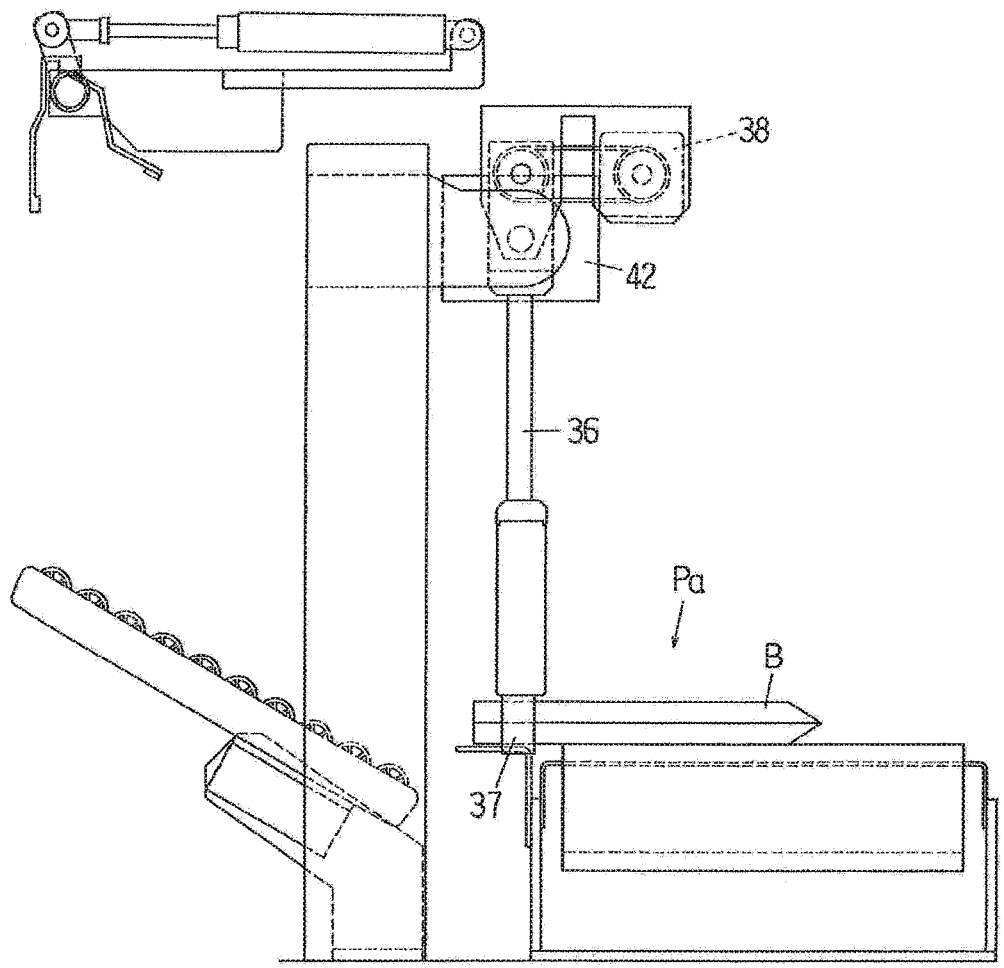
FIG. 8 is a side view showing the behavior of the transfer means for a bag of the supplying device illustrated in FIG. 1 in chronological order.
Figure 9:
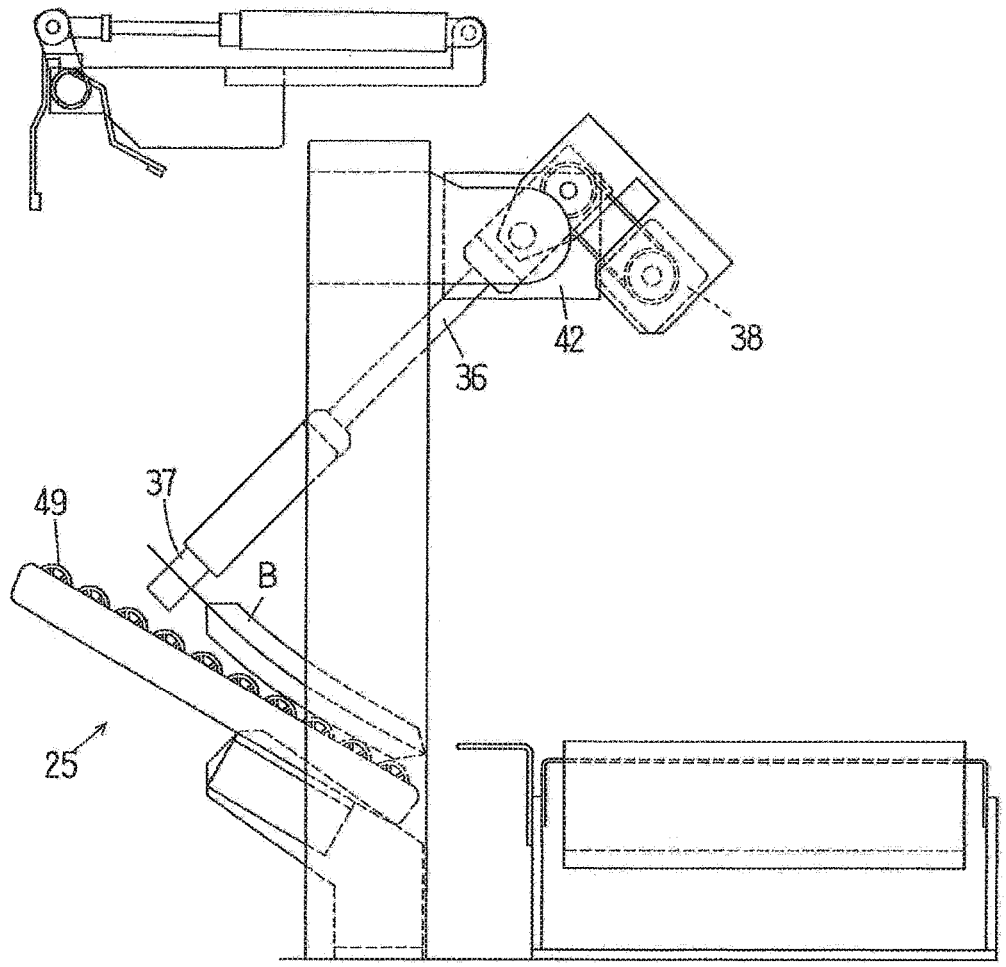
FIG. 9 is a side view showing the behavior of the transfer means for a bag of the supplying device illustrated in FIG. 1 in chronological order.

(4) When the pair of holding members 37, 37 arrives at the takeoff position Pa, the air cylinders 37b of the pair of holding members 37, 37 are operated so that the holding parts 37a, 37a are closed and hold both side edges Ba, Ba of a bag B which stops at the takeoff position Pa (see FIG. 8). Subsequently, the reciprocating driving motor 42 is operated so that the pair of swinging arms 36, 36 positioned in a vertical posture starts to swing upwards, and accordingly the pair of holding members 37, 37 and a bag B are moved along the transfer pathway towards the delivery position Pb (see FIG. 9). In the course of this movement, the bag B is brought into contact with and is supported by the contact members (the rollers 49) of the bag guide means 25. Further, in the course of this movement, the bag B held by the pair of holding members 37, 37 is changed from a horizontal posture to a vertical posture (which is a state in which the bag opening is oriented upwards).

Figure 10:
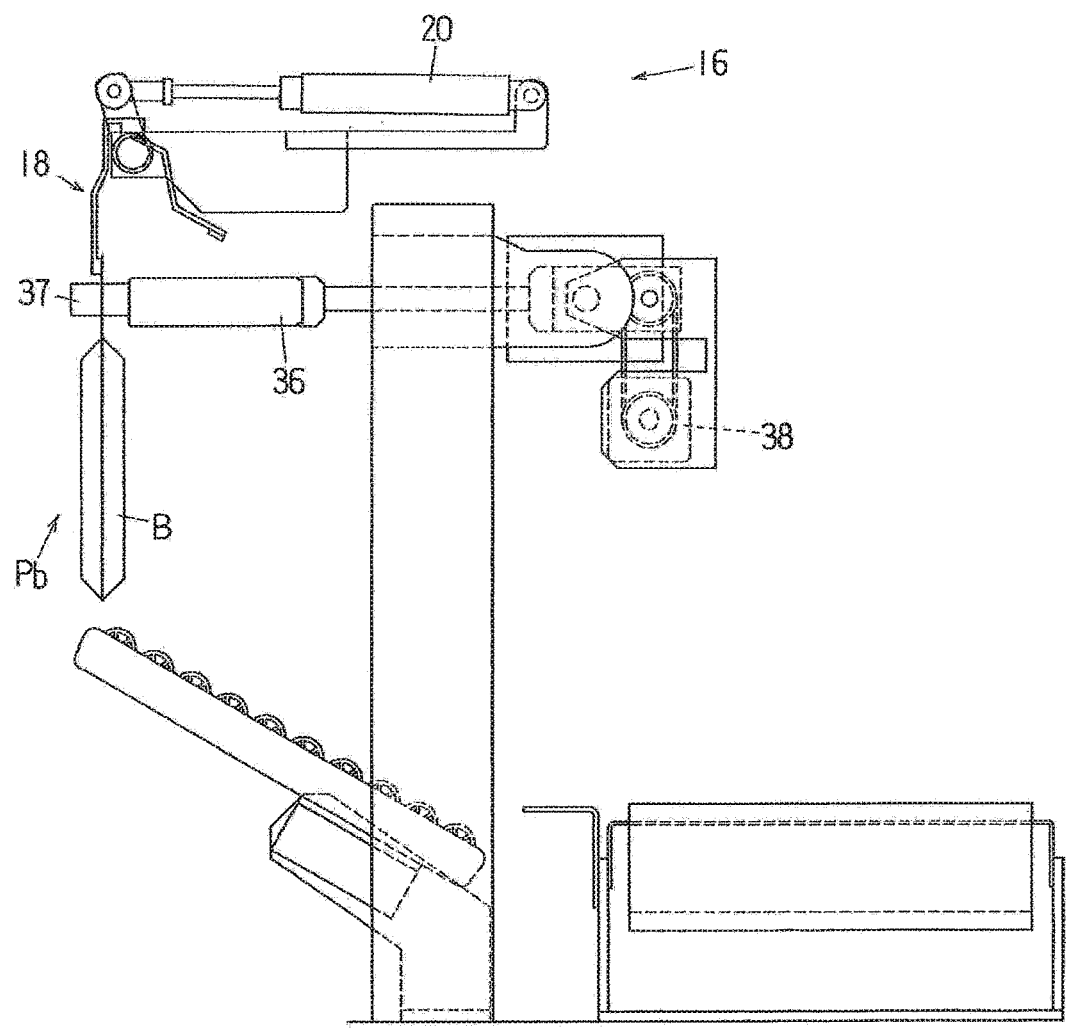
FIG. 10 is a side view showing the behavior of the transfer means for a bag of the supplying device illustrated in FIG. 1 in chronological order.

(5) When the pair of swinging arms 36, 36 is positioned in a horizontal posture, the pair of holding members 37, 37 and the bag B arrive at the terminal of the transfer pathway (i.e., delivery position Pb), and the bag B held by the pair of holding members 37, 37 is positioned in a vertical posture (see FIG. 10).

(6) Preferably, the control device 15 controls the second servo motor 38 in such a manner that, while the pair of holding members 37, 37 (and a bag B) is moved along the transfer pathway from the takeoff position Pa to the delivery position Pb, the interval of the pair of holding members 37, 37 is enlarged according to the nominal width of the bag B and the bag opening of the bag B is strained. This step may be carried out after the pair of holding members 37, 37 (and a bag B) reaches the delivery position Pb.

Instead of enlarging the interval of the pair of holding members 37, 37 based on the nominal width of a bag B as described above, a torque which is applied to the second servo motor 38 while the interval of the pair of holding members 37, 37 is enlarged may be detected, and when this torque reaches a predetermined value, the actuation of the second servo motor 38 may be halted.

Figure 11:
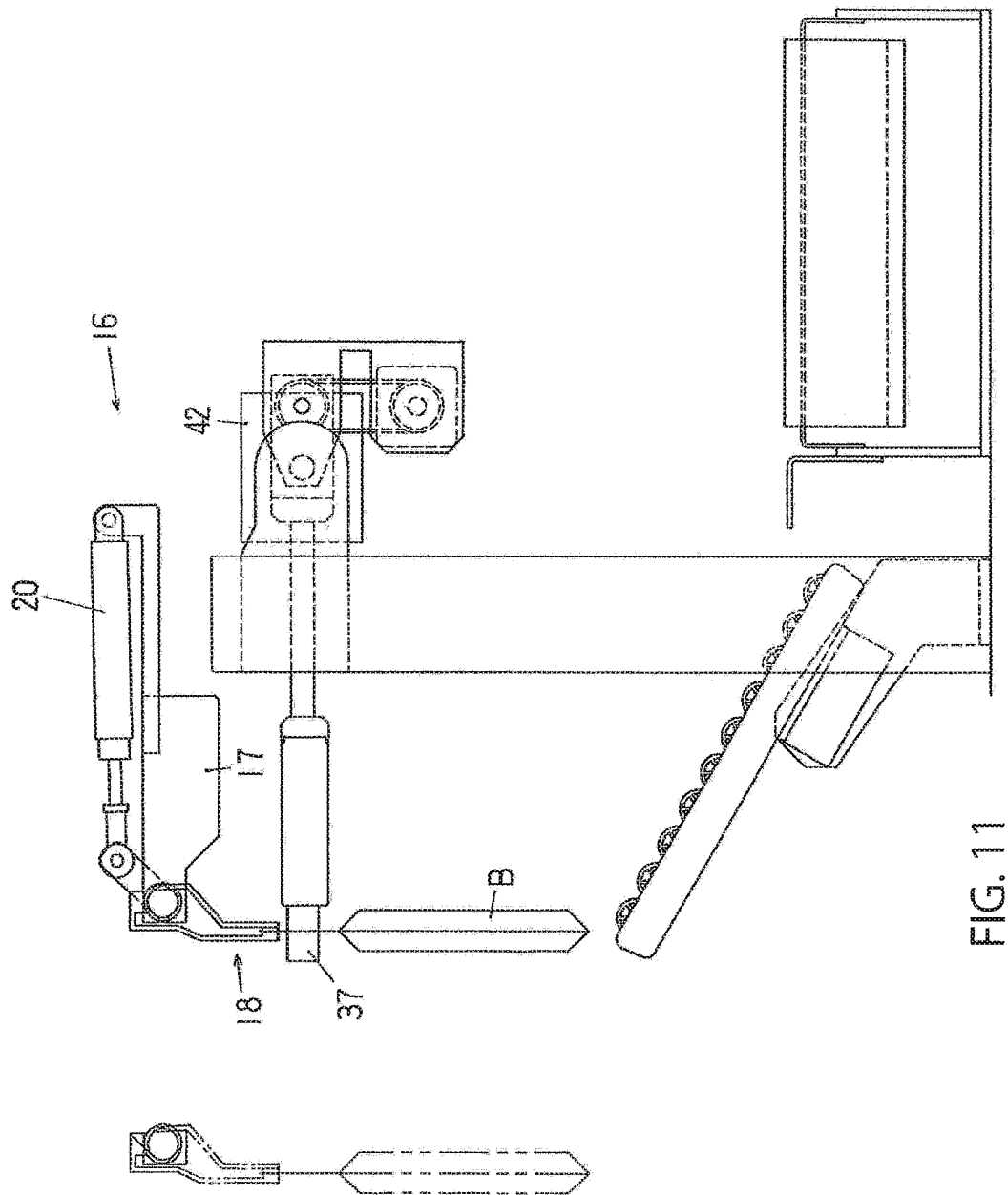
FIG. 11 is a side view showing the behavior of the transfer means for a bag of the supplying device illustrated in FIG. 1 in chronological order.

(7) When the pair of holding members 37, 37 (and a bag B) arrives at the terminal of the transfer pathway (i.e., the delivery position Pb), the air cylinder 20 of the delivery device 16 which is opened at that position (i.e., the standby position) is operated in such a manner that the chuck 18 is closed so as to grip the upper end (bag opening) of the bag B (see FIG. 11). Subsequently, the pair of holding members 37, 37 which holds both side edges Ba, Ba of a bag B are opened so as to release the bag B, the reciprocating driving motor 42 is reversely operated in such a manner that the pair of swinging arms 36, 36 swings downwards, and the pair of holding members 37, 37 is moved towards the takeoff position Pa along the transfer pathway.

(8) As illustrated in FIG. 11 with a chain double-dashed line, the slide member 17 of the delivery device 16 is moved forward in such a manner that the chuck 18 and the bag B move (move forward) from the standby position towards an advance position.

(9) When the chuck 18 and the bag B arrive at the advance position, grippers 8 of the vacuum chamber 4 which stop at a stop position S1 (see FIG. 1) is closed so as to grip the upper end of the bag B (in particular, immediately beneath a part gripped by the chuck 18), and subsequently the chuck 18 is opened to release the bag B. The chuck 18 which has released the bag B is moved towards the standby position (i.e., goes backwards).

(10) A bag B held by grippers 8 of the vacuum chamber 4 receives a predetermined decompression treatment and a packaging treatment such as sealing of the bag opening carried out inside the vacuum chamber 4 while the intermittent movement of the vacuum chamber 4 is performed. When the vacuum chamber 4 stops at a stop position 58 and the grippers 8 are opened, the bag B (product) falls onto the conveyor 13.

[Example in which the Conveyance Means is a Continuous Conveyance Type]

Figure 12:
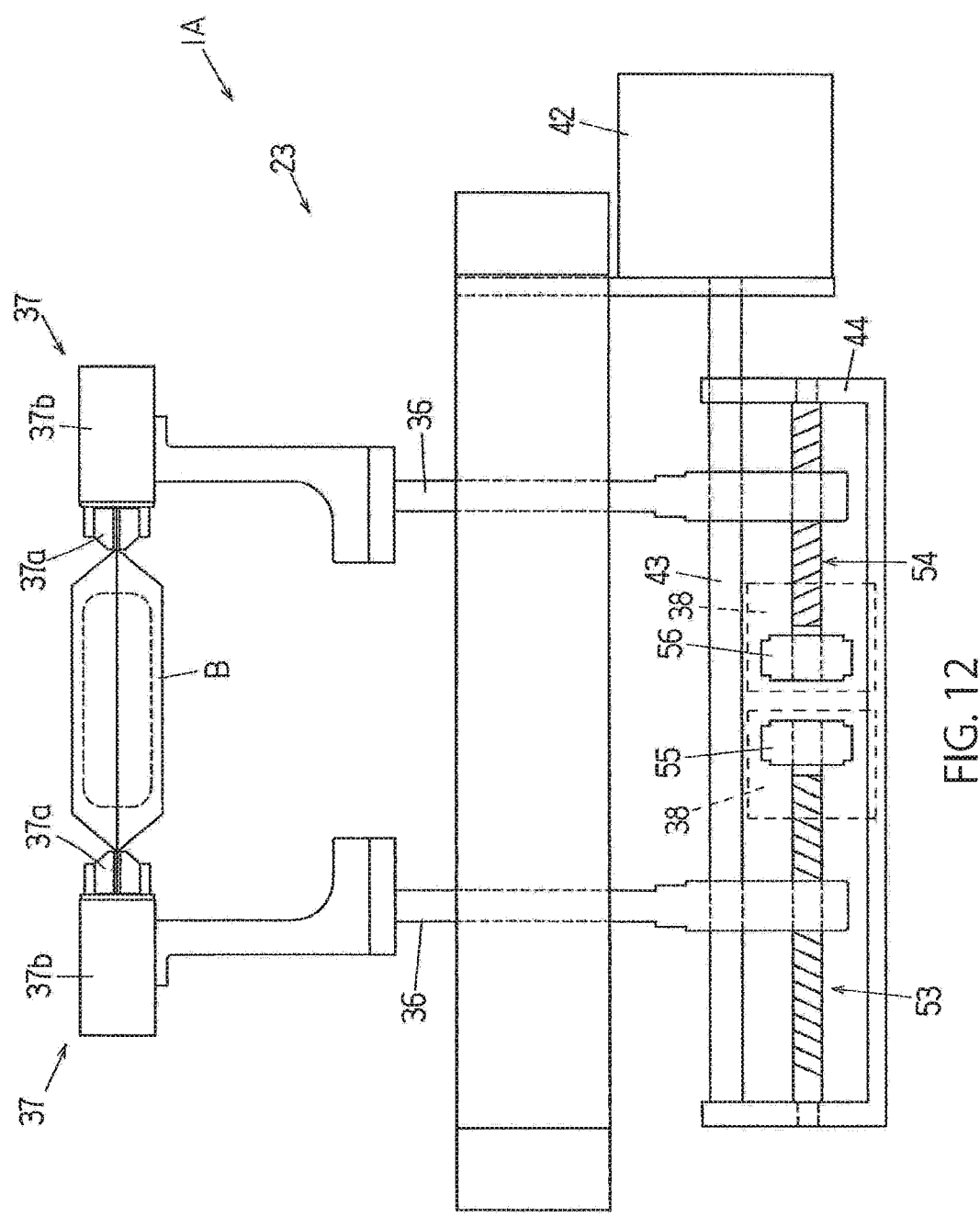
FIG. 12 is a top view of the transfer means for a bag of a supplying device according to another embodiment of the present invention.

Next, with reference to FIGS. 12, 13A and 13B, a method and an apparatus of supplying bags (of a continuous conveyance type) according to another embodiment of the present invention are described. In FIGS. 12, 13A and 13B, parts which are substantially the same as parts illustrated in FIGS. 1 to 11 are provided with the same reference numerals.

A supplying device 1A shown in FIGS. 12, 13A and 13B is different from the supplying device 1 shown in FIGS. 1 to 11 in that the belt conveyor 22 continuously conveys bags B at a constant speed. In order to respond to the continuous conveyance caused by the belt conveyor 22, in the supplying device 1A, the swinging arms 36, 36 forming a pair can be independently moved in a direction perpendicular to the reference plane N by separate second servo motors 38, 38 respectively. Specifically, as shown in FIG. 12, two threaded shafts 53, 54 having thread cuttings which have opposite directions are supported by the frame 44, the base parts of the swinging arms 36 which screw to the threaded shafts 53, 54 respectively, and pulleys 55, 56 are fixed to ends of the threaded shafts 53, 54 respectively. Similar to the pulley 46 of the supplying device 1, the pulleys 55, 56 are connected to the separate second servo motors 38, 38 respectively via belts and driving pulleys (not illustrated). When the second servo motors 38, 38 are operated, the holding members 37, 37 are each moved parallel to the conveyance path via the pulleys 55, 56, the threaded shafts 53, 54 and the swinging arms 36, 36.

Incidentally, when bags B are continuously conveyed by the belt conveyor 22, inertia force caused by acceleration and deceleration of the belt conveyor 22 is not applied to those bags B, and therefore there is an advantage, compared to a case of an intermittent conveyance, in that the posture of the bags B (in particular, the opening condition of the bag openings) is less likely to change during the conveyance.

Next, one example of an operation mode of the above-described supplying device 1A is described, focusing mainly on differences from the supplying device 1, with reference to FIGS. 12, 13A and 13B.

(1) When the pair of swinging arms 36, 36 reaches the lower swing end, the pair of holding members 37, 37 are situated on the upstream side and on the downstream side with respect to a bag B on the belt conveyor 22 (see FIG. 13A). In this situation, the interval of the pair of holding members 37, 37 and the positions of the respective holding members 37, 37 along the conveyance direction of the belt conveyor 22 are an interval and positions which are previously determined depending on the nominal width of a bag B for example. The operation of the two second servo motors 38, 38 are controlled by the control device 15 in such a manner that the interval of the pair of holding members 37, 37 and the positions of the respective holding members 37, 37 in this situation become said determined interval and positions.

(2) When the center of the determined bag width of a bag B on the belt conveyor 22 reaches a position S (i.e., a following start position) which is set on the upstream side by a predetermined distance from the reference plane N, the two second servo motors 38, 38 are operated so that the pair of holding members 37, 37 follows a bag B conveyed continuously on the upstream and downstream sides with respect to the bag B and gradually narrows the interval between the holding members 37, 37. The timing when the center of the determined bag width of a bag B on the belt conveyor 22 reaches the following start position S is calculated by the control device 15 based on the speed of the belt conveyor 22 and the position information on the center of the determined bag width of the bag B determined by the sensor 24. Then, when the bag B reaches the takeoff position Pa on the conveyance path of the belt conveyor 22 and the center of the determined bag width of the bag B reaches the position of the reference plane N (see FIG. 13B), the movement of the pair of holding members 37, 37 is halted. In this situation, simultaneously, the air cylinders 37b, 37b are operated in such a manner that the holding parts 37a, 37a are closed and hold both side edges of the bag B.

When the center of the determined bag width of a bag B reaches the position of the reference plane N (when the pair of holding members 37, 37 is stopped), the center of the pair of holding members 37, 37 is required to be situated on the reference plane N and the interval of the pair of holding members 37, 37 is required to be adjusted to a proper value determined depending on the determined bag width of the bag B. To this end, on the basis of the speed of the belt conveyor 22 and the position information on the determined bag width of the bag B and its center, the control device 15 calculates the movement speed from the time when the pair of holding members 37, 37 starts following the bag B until the time when the center of the determined bag width reaches the position of the reference plane N (when the pair of holding members 37, 37 is stopped) and calculates the position of the pair of holding members 37, 37 at the time when the center of the determined bag width of the bag B reaches the position of the reference plane N (when the pair of holding members 37, 37 is stopped). The control device 15 controls the two second servo motors 38, 38 based on the calculated results in such a manner that, as mentioned above, when the center of the determined bag width of a bag B reaches the position of the reference plane N (when the pair of holding members 37, 37 is stopped), the center of the pair of holding members 37, 37 is situated on the reference plane N and the interval of the pair of holding members 37, 37 is adjusted to a proper value determined depending on the determined bag width of the bag B.

(3) When the pair of holding members 37, 37 reaches the takeoff position Pa, the reciprocating driving motor 42 is operated and the pair of swinging arms 36, 36 which has been positioned in a vertical posture starts swinging upward, and accordingly, the holding members 37, 37 and the bag B are moved toward the delivery position Pb along the transfer pathway.

(4) The operation mode of the supplying device 1 after that is the same as that of the supplying device 1.

Next, another example of the operation mode of the above-described supplying device 1A is described with reference to FIGS. 14A to 14C.

The operation mode of this example is different from that of the above-described example in that, when the center of the determined bag width of a bag B on the belt conveyor 22 reaches the position of the reference plane N, the pair of holding members 37, 37 is not stopped. An explanation on this operation mode which is partially simplified is as follows:

(1) When the pair of swinging arms 36, 36 reaches the lower swinging end, the holding members 37, 37 are situated on the upstream side and on the downstream side with respect to a bag B on the belt conveyor 22.

(2) When the center of the determined bag width of the bag B on the belt conveyor 22 reaches the following start position S, the second servo motors 38, 38 are operated in such a manner that the pair of holding members 37, 37 situated on the upstream and downstream sides to the bag B follows the bag B conveyed continuously and gradually narrows the interval between the holding members 37, 37. Then, when the center of the determined bag width of the bag B reaches the position of the reference plane N (see FIG. 14B), the air cylinders 37b, 37b are operated in such a manner that the holding parts 37a, 37a are closed and hold both side edges Ba, Ba of the bag B.

(3) When the pair of holding members 37, 37 holds both side edges Ba, Ba of the bag B, the reciprocating driving motor 42 is operated, the pair of swinging arms 36, 36 which has been positioned in a vertical posture starts swinging upward along the predetermined transfer pathway, and accordingly, the pair of holding members 37, 37 is moved toward the delivery position Pb and the bag B is withdrawn from the belt conveyor 22. On the other hand, the operation of the second servo motors 38, 38 is continued, the pair of holding members 37, 37 follows the bag B on the belt conveyor 22 and moves downstream at the same speed as the bag B while keeping the constant interval between the holding members 37, 37.

(4) When the center of the determined bag width of the bag B on the belt conveyor 22 reaches a position T (i.e., following end position) which is set on the downstream side by a predetermined distance from the reference plane N, the center of the pair of holding members 37, 37 simultaneously reaches said position T (see FIG. 14C) and the second servo motors 38, 38 are halted. Before this point of time, preferably, the bag B has been completely withdrawn from on the belt conveyor 22.

According to this operation mode, a bag B and the pair of holding members 37, 37 are moved along the conveyance path at the same speed, and therefore, when a bag B is withdrawn from the belt conveyor 22, it is avoided that the bag B is dragged in the conveyance direction of the belt conveyor 22 due to a friction force between the bag B and the bet conveyor 22. Thus, there are no concerns that a bag B receives scratches and a bag B comes off the pair of holding members 37, 37.

[Example in which the Conveyance Means is a Continuous Conveyance Type]

Next, a method and an apparatus of supplying bags according to yet another embodiment of the present invention (a continuous conveyance type) are described with reference to FIG. 15 (and FIGS. 14A to 14C). In FIG. 15, parts which are substantially the same as those in FIGS. 1 to 11 are provided with the same reference numerals.

Similar to the supplying device 1A described above, a supplying device 1B shown in FIG. 15 is different from the supplying device 1 shown in FIGS. 1 to 11 in that the belt conveyor 22 continuously conveys bags B at a constant speed. In order to respond to the continuous conveyance caused by the belt conveyor 22, in the supplying device 1B, the bag transfer means 23 and the bag guide means 25 are installed on a following transfer mechanism 57 so as to be able to reciprocate along the conveyance path of the belt conveyor 22.

As shown in FIG. 15, the following transfer mechanism 57 includes: a box 58 fixed onto the mounting table 26; a movement body 59 installed so as to be movable along the upper surface of the box 58; a screwing member 61 which is fixed to the lower part of the movement body 59 and is positioned in the box 58; and a third servo motor 62 fixed in the box 58. The legs 39a of the stand 39 of the bag transfer means 23 and the support table 51 of the bag guide means 25 are fixed onto the movement body 59.

The third servo motor 62 has a rotation shaft 63 positioned in the box 58, a screw part is formed in the rotation shaft 63, and the screw part screws to a female screw part formed in the screwing member 61. When the third servo motor 62 is operated and the rotation shaft 63 rotates, the bag transfer means 23 and the bag guide means 25 are moved along the conveyance path (in a direction parallel to the conveyance path). In the supplying device 1B, the bag transfer means 23 and the bag guide means 25 are substantially the same as those in the supplying device 1.

The above-described supplying device 1B may be actuated in an operation mode similar to the operation mode of the supplying device 1A (see FIGS. 13A, 13B, and 14A to 14C). One example of the operation mode of the above-described supplying device 1B is explained below with reference to FIG. 15 (and FIGS. 14A to 14C).

Figure 14A:
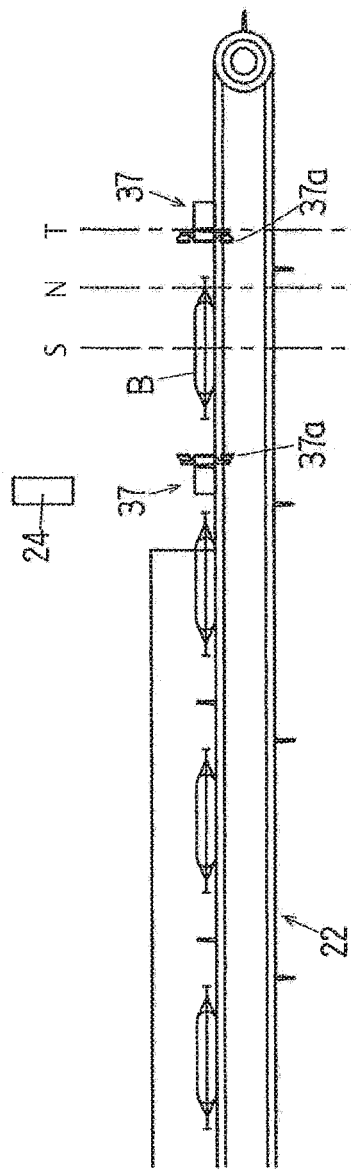
FIG. 14A is a side view showing another example of the behavior of the transfer means for a bag illustrated in FIG. 12 in chronological order.
Figure 14B:
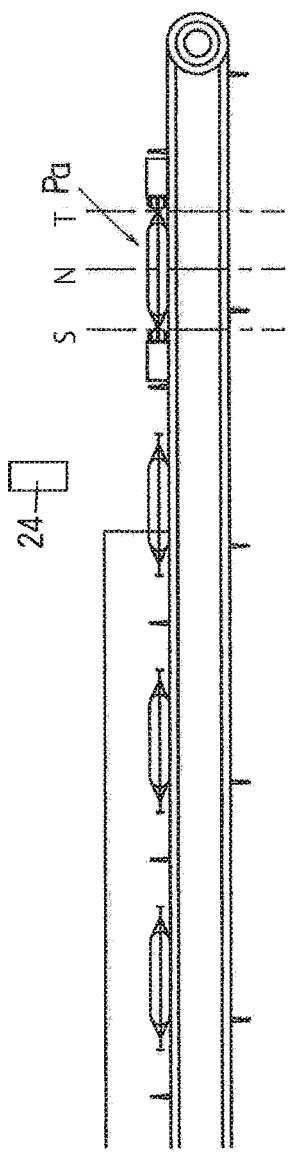
FIG. 14B is a side view showing another example of the behavior of the transfer means for a bag illustrated in FIG. 12 in chronological order.
Figure 14C:
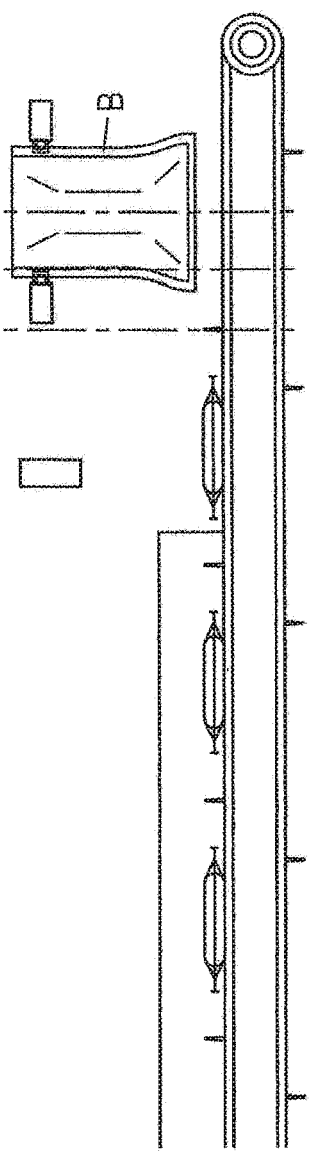
FIG. 14C is a side view showing another example of the behavior of the transfer means for a bag illustrated in FIG. 12 in chronological order.

(1) When the pair of swinging arms 36, 36 reaches the lower swinging end, the bag transfer means 23 is positioned at a predetermined position (i.e., reciprocating start position) along the convey direction of the belt conveyor 22, and the holding members 37, 37 are positioned on the upstream side and on the downstream side with respect to a bag B on the belt conveyor 22 (see FIG. 14A). In this situation, the interval of the pair of holding members 37, 37 and the position of each holding member 37 (the position of the bag transfer means 23) are an interval and a position which are previously determined based on the nominal width of the bag B for example. The control device 15 controls the operations of the second servo motors 38 and the third servo motor 62 in such a manner that the interval and the position of the pair of holding members 37, 37 in this situation are the predetermined interval and position.

(2) When the center of the determined bag width of the bag B on the belt conveyor 22 reaches the following start position S, the second and third servo motors 38, 62 are operated in such a manner that the pair of holding members 37, 37 is moved on the upstream side and on downstream side of the bag B in a direction parallel to the conveyance path so as to follow the bag B conveyed continuously and gradually narrow the interval between the holding members 37, 37. Subsequently, when the center of the determined bag width of the bag B reaches the position of the reference plane N (see FIG. 14B), the air cylinders 37b, 37b are operated in such a manner that the holding parts 37a, 37a are closed and hold both side edges Ba, Ba of the bag B, and simultaneously the second servo motors 38 are halted. In this situation, the center of the pair of holding members 37, 37 is also required to be positioned on the reference plane N, and the interval of the pair of holding members 37, 37 is required to be adjusted to a proper value according to the determined bag width of the bag B.

(3) When the pair of holding members 37, 37 has held both side edges Ba, Ba of the bag B, the reciprocating driving motor 42 is operated, the pair of swinging arms 36, 36 which has been positioned in a vertical posture starts swinging upward along the predetermined transfer pathway, and accordingly, the pair of holding members 37, 37 is moved towards the delivery position Pb and the bag B is withdrawn from on the belt conveyor 22. On the other hand, the operation of the third servo motor 62 is continued, and the pair of holding members 37, 37 follows the bag B placed on the belt conveyor 22 and moves toward the downstream side at the same speed as the bag B while keeping holding both side edges of the bag B.

(4) When the center of the determined bag width of the bag B on the belt conveyor 22 reaches the position T (i.e., following end position) which is set on the downstream side by a predetermined distance from the reference plane N, the center of the pair of holding members 37, 37 simultaneously reaches said position T (see FIG. 14C), the third servo motor 62 is stopped and the movement of the bag transfer means 23 (the pair of holding members 37, 37) stops. In this situation, preferably, the bag B is completely withdrawn from on the belt conveyor 22.

[Example in which the Bag Transfer Means has a Function to Adjust the Alignment Direction of the Pair of Holding Members]

Figure 16:
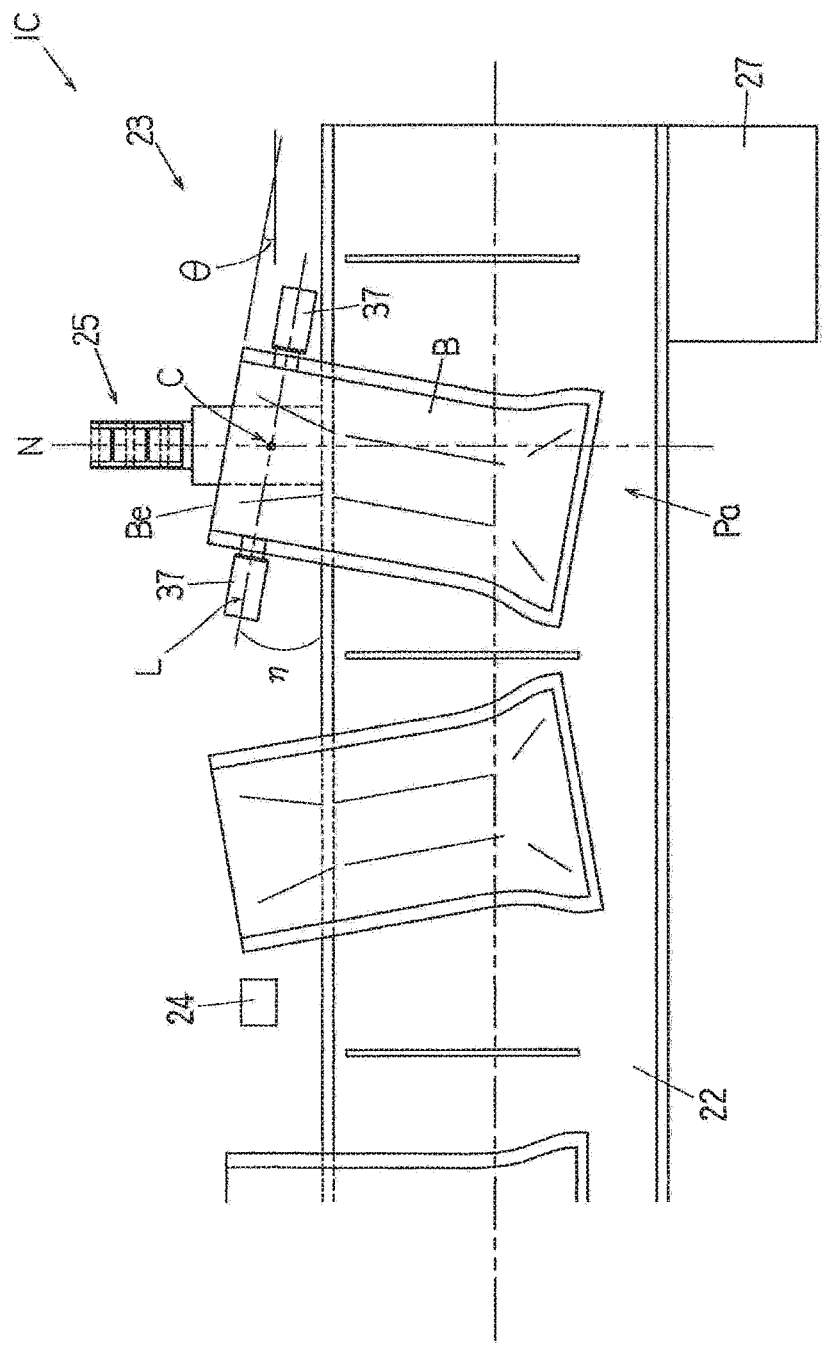
FIG. 16 is a top view describing angle adjustment of a pair of holding members of a supplying device according to yet another embodiment of the present invention.

Desirably, the width direction of a bag B placed on the conveyance means (belt conveyor 22) (i.e., a direction along the bag opening edge Be) is parallel to the conveyance path of the belt conveyor 22, but in some cases, said width direction slants with respect to the conveyance path (to have an inclination angle θ) as shown in FIG. 16. When the right and left side edges Ba, Ba of a bag B having such an inclination angle θ are held with the pair of holding members 37, 37 of which the alignment direction is parallel to the conveyance path (i.e., with the holding members 37, 37 of the bag transfer means 23 in the supplying devices 1, 1A, 1B illustrated in FIGS. 1 to 15), a difference between the right and left holding positions occurs in the vertical direction (that is, the distances from the bag opening edge Be to the right and left holding positions respectively are different from each other). Therefore, when the pair of holding members 37, 37 and a bag B reach the delivery position Pb (see FIG. 10) along the transfer pathway and the posture of the bag B has been changed to be a vertical posture, the bag B is in a state in which the bag opening edge Be slants with respect to the horizontal plane (to have an inclination angle θ). When this bag B is held with grippers 8 of the vacuum packaging machine 2 via the delivery device 16, the state in which the bag opening edge Be of the bag B slants with respect to the horizontal plane is kept. Since the sealing of the bag opening is carried out in the vacuum chamber 4 while such state is kept, the sealing of the bag opening becomes an inclined sealing, the beauty of the bag is marred when the inclination angle θ is large, and deterioration of the sealing strength might occur.

A method and an apparatus of supplying bags according to yet another embodiment of the present invention (i.e., an example classified as an intermittent conveyance type in which the bag transfer means has a function of adjusting a direction of alignment of the pair of holding members) are described below with reference to FIGS. 16 to 19C.

Figure 17:
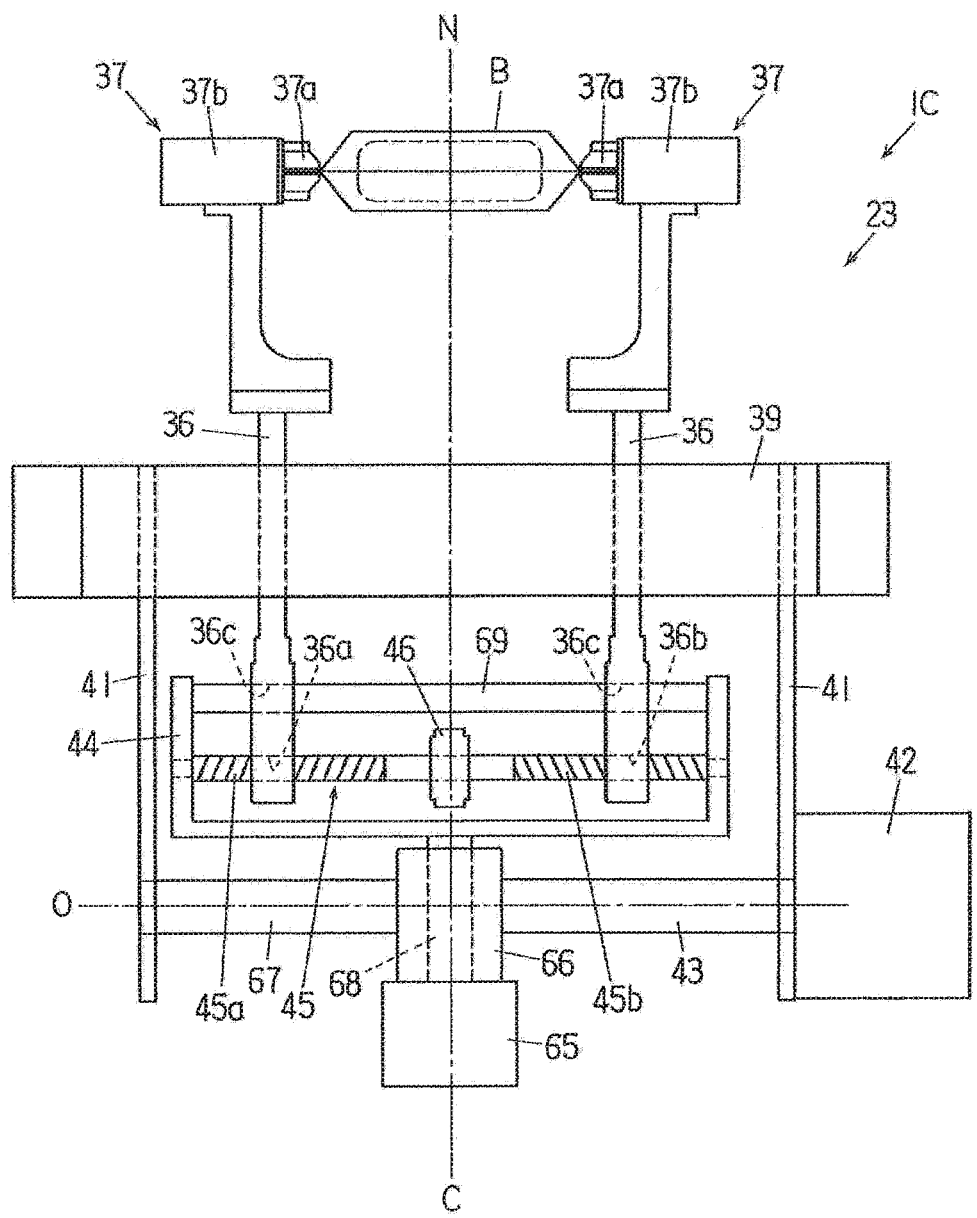
FIG. 17 is a top view of the transfer means for a bag of the supplying device illustrated in FIG. 16

According to a supplying device 1C shown in FIGS. 16 and 17, the pair of holding members 37, 37 is able to properly hold both side edges Ba, Ba of a bag B having reached the takeoff position Pa and to cause the bag opening edge Be of the bag B which has been moved to the delivery position Pb and been positioned in a vertical posture to be oriented in an approximately horizontal direction, even if the width direction (i.e., the direction along the bag opening edge Be) of the bag B placed on the belt conveyor 22 is oblique to the conveyance path of the belt conveyor 22.

In FIGS. 16 to 19C, parts which are substantially the same as those illustrated in FIGS. 1 to 11 are provided with the same numbers.

The supplying device 1C is different from the supplying device 1 shown in FIGS. 1 to 11 mainly in the following four points but are substantially the same as the supplying device 1 in the other points.

(1) In the bag transfer means 23, the pair of holding members 37, 37 is supported while being able to swing around the axis C located on the reference plane N.

(2) A fourth servo motor 65 which serves as a driving source causing the pair of holding members 37, 37 to swing around the axis C is provided with the bag transfer means 23.

(3) The sensor 24 measures an inclination angle of a bag B (an inclination angle θ of the bag opening edge Be with respect to the conveyance path) on the belt conveyor 22.

(4) The control device 15 controls the fourth servo motor 65 mentioned below according to the inclination angle θ determined by the sensor 24 in such a manner that the pair of holding members 37, 37 is caused to swing around the axis C to adjust the alignment direction of the pair of holding members 37, 37 and thereby the holding positions on both side edges Ba, Ba are properly adjusted.

Regarding the specific structure of the bag transfer means 23 in the supplying device 1C (see FIG. 17), the stand 39 of a gate type is installed on the mounting table 26 (see FIG. 5), the reciprocating driving motor 42 is fixed to one bracket 41 of the pair of brackets 41, 41 provided with the stand 39, and one side of a retaining member 66 is fixed to the end of the rotation shaft 43 (the center of which coincides with the axis O) of the reciprocating driving motor 42. One end of a support shaft 67 arranged coaxially with the rotation shaft 43 is rotatably supported by the other bracket 41 of the pair of brackets 41, 41, and the other side of the retaining member 66 is fixed to the other end of the support shaft 67. The fourth servo motor 65 is fixed to the retaining member 66, the rotation shaft 68 of the fourth servo motor 65 (the center of which coincides with the axis C) penetrates through the center of the retaining member 66, and the end of the rotation shaft 68 is fixed to the frame 44. The axis C is situated on the reference plane N, perpendicularly intersects with the axis O, is perpendicular to the holding surfaces of the holding parts 37a of the holding members 37, and passes through the center of the pair of holding members 37, 37.

While the both ends of the threaded shaft 45 are rotatably supported by the frame 44, the both ends of a support shaft 69 are fixed to the frame 44. The threaded shaft 45 includes screw parts 45a, 45b provided on the right and left sides, the screw parts 45a, 45b have thread cuttings which have opposite directions respectively, and the pulley 46 is fixed to the center part of the threaded shaft 45. Similar to the supplying device 1 shown in FIGS. 1 to 11, the second servo motor 38 (see FIG. 5) is installed on the frame 44, and when the second servo motor 38 is rotated, its driving force is transmitted to the pulley 46, so that the threaded shaft 45 is rotated.

In the base part of each of the swinging arms 36, the female screw part 36a (36b) which screws to the screw part 45a (45b) of the threaded shaft 45 and the bore 36c through which the support shaft 69 penetrates are formed, and the holding members 37 are provided in the leading ends of the respective swinging arms 36. The support shaft 69 has a function of preventing the swinging arms 36 from rotating along with rotation of the threaded shaft 45. The holding members 37 include the air cylinders 37b respectively which cause the holding parts 37a, 37a of a double door type to open and close.

When the second servo motor 38 (see FIG. 5) is operated, the threaded shaft 45 is rotated, the pair of swinging arms 36, 36 comes close to each other or gets away from each other while the reference plane N is between the swinging arms 36, 36, and accordingly, the pair of holding members 37, 37 comes close to each other or gets away from each other while the reference plane N is between the holding members 37, 37 (that is, the interval of the pair of holding members 37, 37 is narrowed or enlarged).

The rotation shaft 43 is rotated back and forth within an angular range of 90 degrees by the reciprocating driving motor 42. Accordingly, similar to the supplying device 1 shown in FIGS. 1 to 11, the pair of swinging arms 36, 36 swings around the axis O within an angular range of 90 degrees between a vertical posture and a horizontal posture, and the holding members 37 provided on the leading ends of the swinging arms 36, 36 respectively also rotate around axis O within an angular range of 90 degrees between the takeoff position Pa and the delivery position Pb.

When the fourth servo motor 65 is operated, the rotation shaft 68 and the frame 44 are rotated, and accordingly, the pair of holding members 37, 37 swings around the axis C by a predetermined angle, so that the alignment direction of the pair of holding members 37, 37 is adjusted.

The sensor 24 has a function of determining the position information on the bag width (i.e., determined bag width) in a direction parallel to the conveyance direction of a part in a neighborhood of the bag opening of a bag B conveyed on the belt conveyor 22 and the position information on the center of the bag width, and also has a function of determining the inclination angle of a bag B (i.e., the inclination angle θ of the bag opening edge Be with respect to the conveyance path).

Similar to the supplying device 1 shown in FIGS. 1 to 11, the control device 15 (see FIG. 1) controls the first servo motor 27 according to the position information on the center of the determined bag width of a bag B so as to adjust the intermittent conveyance distance of the belt conveyor 22 in such a manner that the center of the determined bag width of the bag B which has come to stop at the takeoff position Pa is situated on the reference plane N. Further, the control device 15 calculates the bag width in the width direction of a bag B (i.e., in a direction parallel to the bag opening edge Be) according to the inclination angle θ and the determined bag width of the bag B determined by the sensor 24 (the bag width in the width direction can be approximately calculated according to the formula "D×cos θ" in which "D" denotes the determined bag width), and controls the second servo motor 38 according to the calculated bag width so as to adjust the interval of the pair of holding members 37, 37.

In addition to that, the control device 15 controls the fourth servo motor 65 according to the inclination angle θ so as to cause the pair of the holding members 37, 37 to swing around the axis C from a reference position by an angle η (=θ), so that the alignment direction of the pair of holding members 37, 37 is adjusted. Thus, when the swinging arms 36, 36 get in a vertical posture and the pair of holding members 37, 37 reaches the takeoff position Pa, the alignment direction of the pair of holding members 37, 37 (see a line L connecting the holding parts 37a, 37a of the pair of holding members 37, 37 with each other) is inclined with respect to the conveyance path in the horizontal plane and the inclination angle is produced as shown in FIG. 16. The reference position means a position of the pair of holding members 37, 37 when the alignment direction of the pair of holding members 37, 37 is parallel to the conveyance path (i.e., "η=0" is satisfied).

When "η=0" is satisfied, the line L (i.e., the alignment direction of the pair of holding members 37, 37) and the bag opening edge Be of the bag B are parallel to each other at the takeoff position Pa. Therefore, when the pair of holding members 37, 37 holds both side edges of the bag B at the takeoff position Pa, the holding positions on the right and left sides can be aligned (that is, the distances from the bag opening edge Be to the holding positions on the right and left sides can coincide with each other) as is clear from FIG. 16.

Subsequently, while the pair of holding members 37, 37 is moved along the transfer pathway towards the delivery position Pb (see FIG. 10) or after the pair of holding members 37, 37 reaches the delivery position Pb, the fourth servo motor 65 is reversely operated so as to cause the pair of holding members 37, 37 to swing around the axis C in the opposite direction by an angle η (=θ) and return to the reference position. Thus, the bag opening edge Be of a bag B of which both side edges Ba, Ba are held by the pair of holding members 37, 37 can be placed in a horizontal position at the delivery position Pb.

One example of reciprocating swinging of the pair of holding members 37, 37 around the axis C in the transfer pathway caused by operation of the fourth servo motor 65 is described in detail in chronological order with reference to FIGS. 18A to 19C, FIGS. 18A to 19C are simplified illustrations in which the illustration of some elements is omitted.

Figure 18A:
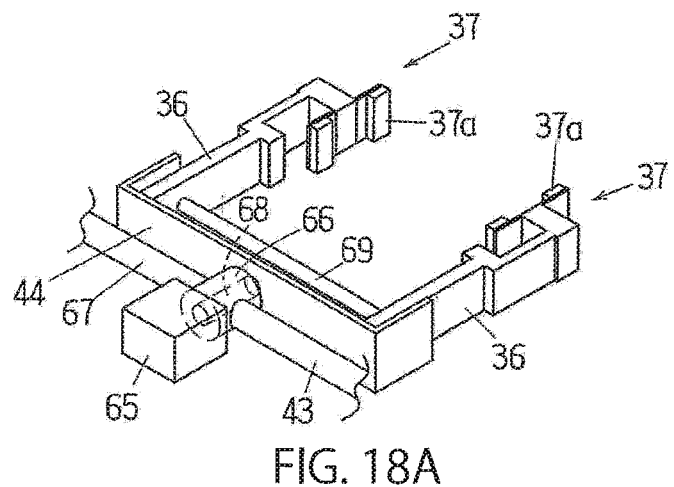
FIG. 18A is a view showing angle adjustment of the pair of holding members carried out on a conveyance path in the transfer means for a bag of the supplying device illustrated in FIG. 16 in chronological order.

(1) FIG. 18A shows a situation in which the holding members 37, 37 are opened at the end of the transfer pathway (i.e., at the delivery position Pb) and a bag B has been released from the holding members 37, 37. In this situation, the holding members 37, 37 are situated at the reference position. Subsequently, the interval of the pair of holding members 37, 37 is adjusted to correspond to the determined bag width having been determined by the sensor 24 (i.e., the bag width measured in a direction parallel to the conveyance path).

Figure 18B:
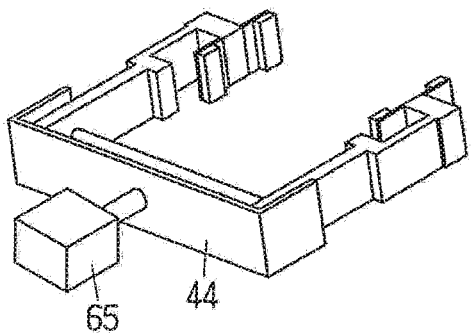
FIG. 18B is a view showing angle adjustment of the pair of holding members carried out on a conveyance path in the transfer means for a bag of the supplying device illustrated in FIG. 16 in chronological order.

(2) FIG. 18B shows a situation in which the fourth servo motor 65 is operated based on the inclination angle (θ) of a bag B having been determined by the sensor 24, and the pair of holding members 37, 37 has swung around the axis C, together with the frame 44 and the swinging arms 36, 36, from the reference position by a predetermined angle (η=θ).

Figure 18C:
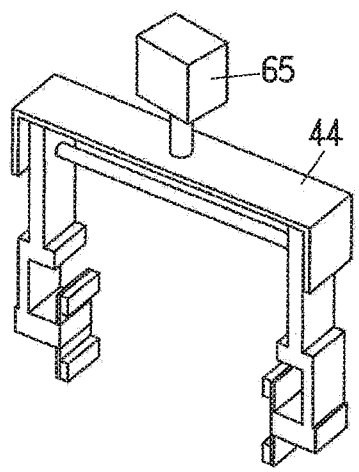
FIG. 18C is a view showing angle adjustment of the pair of holding members carried out on a conveyance path in the transfer means for a bag of the supplying device illustrated in FIG. 16 in chronological order.

(3) FIG. 18C shows a situation in which the reciprocating driving motor 42 is operated, the pair of swinging arms 36, 36 swings from a horizontal posture toward a vertical posture, and the pair of holding members 37, 37 has reached the lower takeoff position Pa. The pair of holding members 37, 37 is inclined with respect to the conveyance path by an angle η (η=θ). In this situation, the bag B stops at the takeoff position Pa. In this example, swinging of the pair of holding members 37, 37 by an angle η is carried out at the delivery position Pb, but this swinging may be carried out after the pair of holding members 37, 37 reaches the takeoff position Pa or on the transfer pathway before the pair of holding members 37, 37 reaches the takeoff position Pa.

Figure 19A:
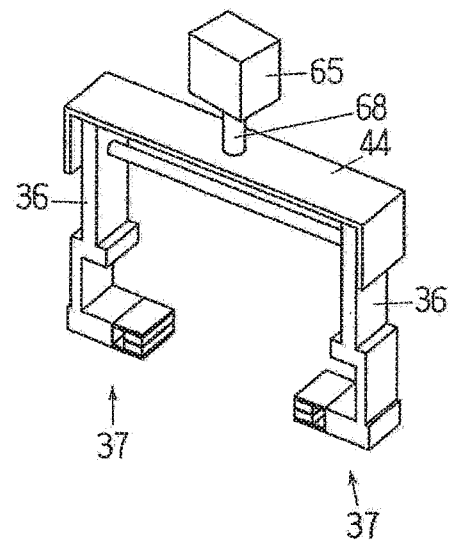
FIG. 19A is a view showing angle adjustment of the pair of holding members carried out on a conveyance path in the transfer means for a bag of the supplying device illustrated in FIG. 16 in chronological order.

(4) FIG. 19A shows a situation in which the pair of holding members 37, 37 is closed at the takeoff position Pa and holds both side edges Ba, Ba of a bag B (not illustrated). The alignment direction of the pair of holding members 37, 37 is inclined with respect to the conveyance path in the horizontal plane by an angle η (=θ) (see FIG. 16). Before the pair of holding members 37, 37 is closed and holds both side edges Ba, Ba of the bag B, the interval of the pair of holding members 37, 37 is adjusted to correspond to the bag width in the width direction of the bag B (i.e., in a direction parallel to the bag opening edge Be).

Figure 19B:
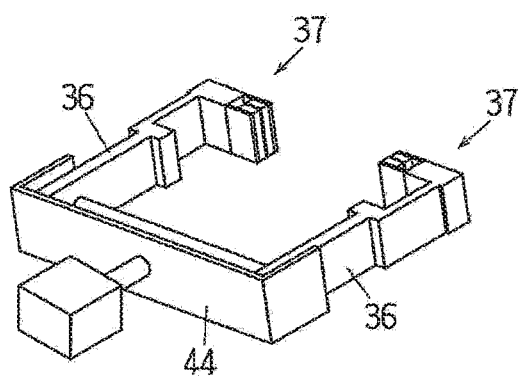
FIG. 19B is a view showing angle adjustment of the pair of holding members carried out on a conveyance path in the transfer means for a bag of the supplying device illustrated in FIG. 16 in chronological order.

(5) FIG. 19B shows a situation in which the reciprocating driving motor 42 is operated, the pair of swinging arms 36, 36 swings from a vertical posture towards a horizontal posture, and the pair of holding members 37, 37 has reached the upper delivery position Pb (see FIG. 10). In this situation, the pair of holding members 37, 37 keeps the state in which the holding members 37, 37 have swung by a predetermined angle (η=θ).

Figure 19C:
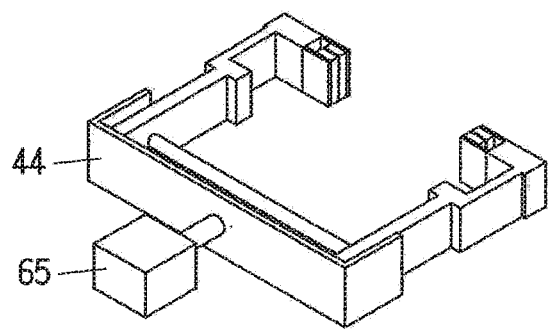
FIG. 19C is a view showing angle adjustment of the pair of holding members carried out on a conveyance path in the transfer means for a bag of the supplying device illustrated in FIG. 16 in chronological order.

(6) FIG. 19C shows a situation in which the fourth servo motor 65 is reversely operated, the pair of holding members 37, 37 is caused to swing, together with the frame 44 and the swinging arms 36, 36, around the axis C in the opposite direction by the predetermined angle (η) and return to the reference position. In this situation, the bag opening edge Be of the bag B (not illustrated) of which both side edges are held by the pair of holding members 37, 37 is in a horizontal position. In this example, the reverse swinging of the pair of holding members 37, 37 is carried out at the delivery position Pb, but this swinging may be carried out after the pair of holding members 37, 37 reaches the delivery position Pb or on the transfer pathway before the pair of holding members 37, 37 reaches the delivery position Pb.

[Another Example in which the Bag Transfer Means has a Function of Adjusting the Alignment Direction of the Pair of Holding Members]

Preferably, a bag B placed on the conveyance means (belt conveyor 22) is arranged at a constant position in a direction perpendicular to the conveyance path of the belt conveyor 22 (hereinafter referred to as a "lengthwise reference position"). If the position where a bag B is placed deviates from the lengthwise reference position in a direction perpendicular to the conveyance path, the holding positions deviates from proper positions in the longitudinal direction of the bag B (i.e., in a direction perpendicular to the bag opening edge Be) when the pair of holding members 37, 37 holds both side edges Ba, Ba of the bag B at the takeoff position. This deviation of the holding positions is passed down from the pair of holding members 37, 37 to grippers 8 of the vacuum packaging machine 2 via the delivery device 16. Then, sealing of the bag opening is carried out in the vacuum chamber 4 while such state remains, and therefore the position of sealing of the bag opening deviates from a proper position, and if the amount of such deviation is large, the beauty of the bag is marred and deterioration of the sealing strength might also occur.

A method and an apparatus for supplying bags according to yet another embodiment of the present invention (i.e., an example in which an intermittent conveyance type is adopted and the bag transfer means has a function of adjusting the alignment direction of the pair of holding members) are described below with reference to FIGS. 20 to 26.

Figure 20:
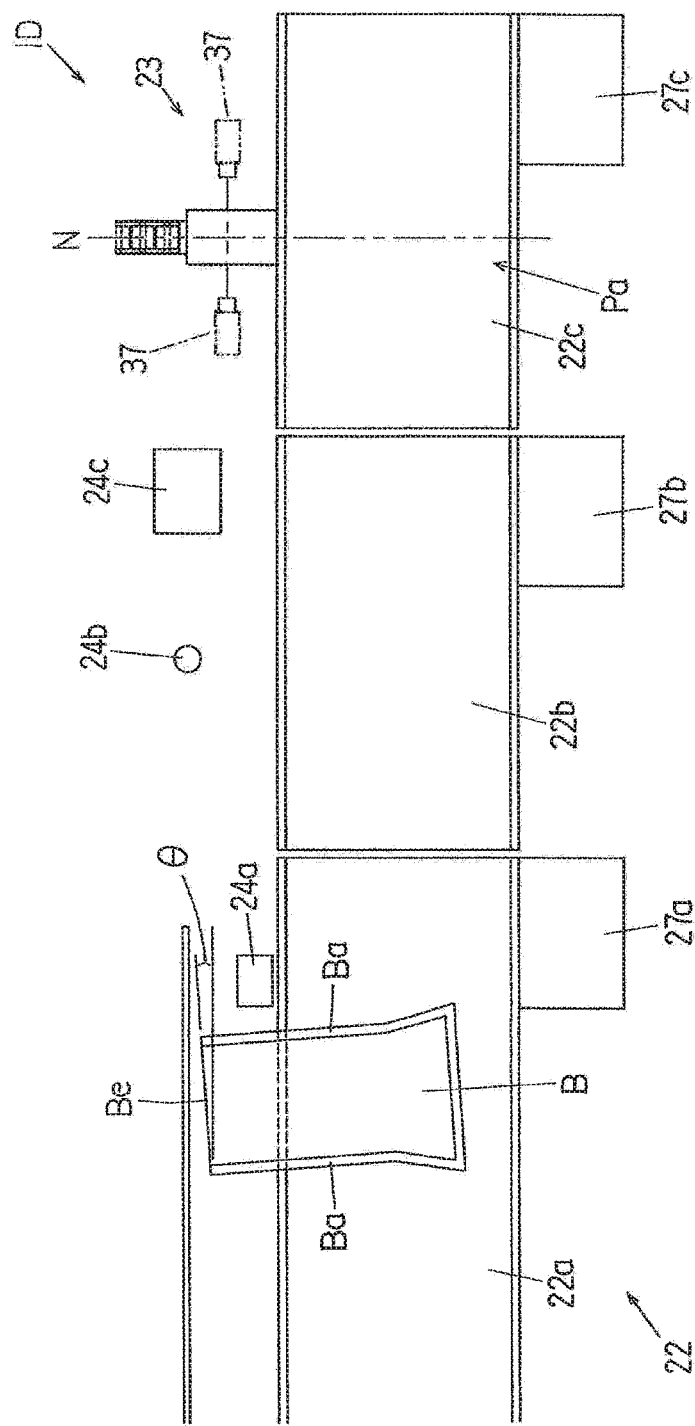
FIG. 20 is a top view describing angle adjustment and position adjustment of a bag on the conveyance path in a supplying device according to yet another embodiment of the present invention.

Similar to the supplying device 1C, in a supplying device 1D shown in FIG. 20, the bag transfer means 23 has a function of adjusting the alignment direction of the pair of holding members 37, 37. Further, according to the supplying device 1D, even when the position of a bag B placed on the belt conveyor 22 deviates from the lengthwise reference position in a direction perpendicular to the conveyance path, such deviation is remedied on the belt conveyor 22 and the pair of holding members 37, 37 can hold proper positions of both side edges Ba, Ba of the bag B which has reached the takeoff position Pa.

The bag transfer means 23 of the supplying device 1D is the same as that of the supplying device 1C. The supplying device 1D is different from the supplying device 1C mainly in the following three points, but is substantially the same as the supplying device 1C in the other points.

(1) The belt conveyor 22 includes three sub-conveyors 22a, 22b, 22c arranged in series from the upstream side towards the downstream side of the conveyance path. The sub-conveyors 22a, 22b, 22c are each classified as an intermittent conveyance type and are provided with servo motors 27a, 27b, 27c serving as driving sources. When a servo motor 71 (see FIG. 26) is operated, the sub-conveyor 22b can be moved in a direction perpendicular to the conveyance path in the horizontal plane.

(2) Three sensors 24a, 24b, 24c are arranged along the conveyance path of the belt conveyor 22 (22a, 22b, 22c) from the upstream side towards the downstream side. The sensor 24a determines the position information on the bag width of a part in a neighborhood of the bag opening of a bag B on the sub-conveyor 22a (the bag width measured in a direction parallel to the conveyance path (=the determined bag width)) and the position information on the center of the bag width. The sensor 24b determines the position information on the bag opening edge Be of a bag B on the sub-conveyor 22b (the amount of deviation from the lengthwise reference position). The sensor 24c determines the inclination angle of a bag B on a sub conveyor 22b (i.e., the inclination angle θ of the bag opening edge Be with respect to the conveyance path).

(3) The control device 15 controls the servo motor 71 according to the detection results of the sensor 24b so as to cause the sub-conveyor 22b to move a direction perpendicular to the conveyance path to correct the deviation amount (that is, to shift the position of a bag B to the lengthwise reference position).

Figure 26:
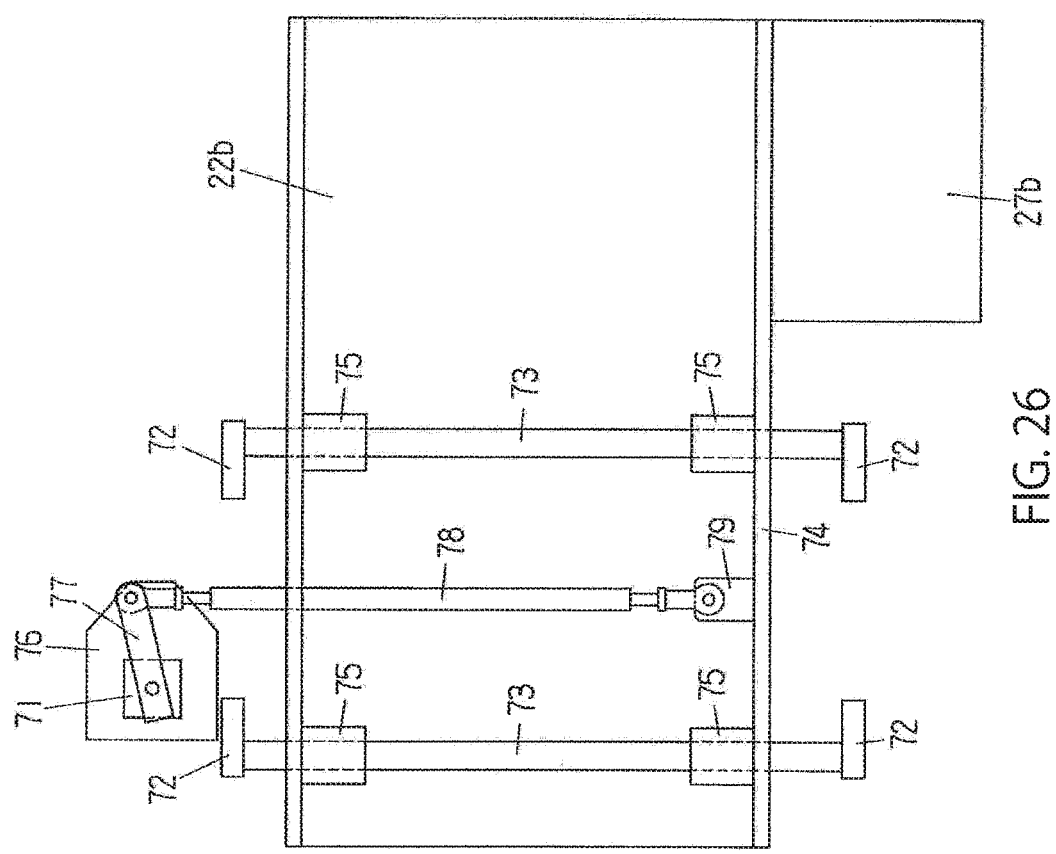
FIG. 26 is a view showing an operative mechanism of one belt conveyor included in a conveyance means of the supplying device illustrated in FIG. 20.

The specific structure of the sub-conveyor 22b is described with reference to FIG. 26. Two pairs of stands 72, 72 are erected on the mounting table 26 (see FIG. 2) of the supplying device 1D, and to each pair of stands 72, 72, both ends of a guide member 73 are fixed. The guide Members 73 are situated in the horizontal plane, and the longitudinal direction of each of the guide members 73 is perpendicular to the conveyance path of the sub-conveyor 22b. Four slide blocks 75 are fixed to the frame 74 of the sub conveyor 22b, two slide blocks 75 are slidably fitted with one of the guide members 73, and the other two slide blocks 75 are slidably fitted with the other of the guide members 73. Further, the servo motor 71 is installed on a stand 76 provided on the mounting table 26, one end of a lever 77 is fixed to the rotation shaft of the servo motor 71, and the other end of the lever 77 is connected to one end of a connection rod 78. A block 79 is fixed to one side of the frame 74, and the other end of the connection rod 78 is connected to the block 79.

When the servo motor 71 is operated, the lever 77 is rotated, and the frame 74 (sub-conveyor 22b) is moved via the connection rod 78 in the axial direction of the guide members 73 (i.e., in a direction perpendicular to the conveyance path).

An example of operation of the supplying device 1D is described below in detail in chronological order with reference to FIGS. 20 to 25.

(1) In FIG. 20, the belt conveyor (22a, 22b, 22c) is operated and a bag B is conveyed by the sub-conveyor 22a. The bag B is inclined with respect to the conveyance path of the belt conveyor 22, and the position of the bag B in a direction perpendicular to the conveyance path deviates from the lengthwise reference position.

Figure 21:
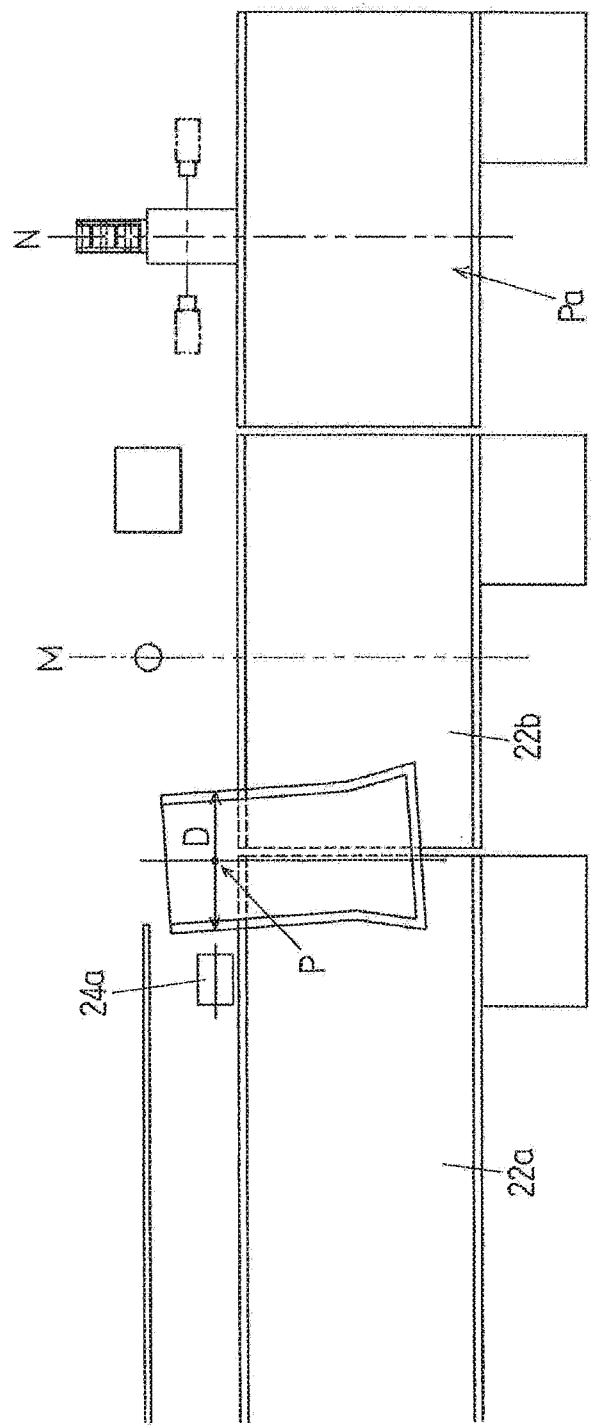
FIG. 21 is a view showing angle adjustment and position adjustment of a bag on the conveyance path in the supplying device illustrated in FIG. 20 in chronological order.
Figure 22:
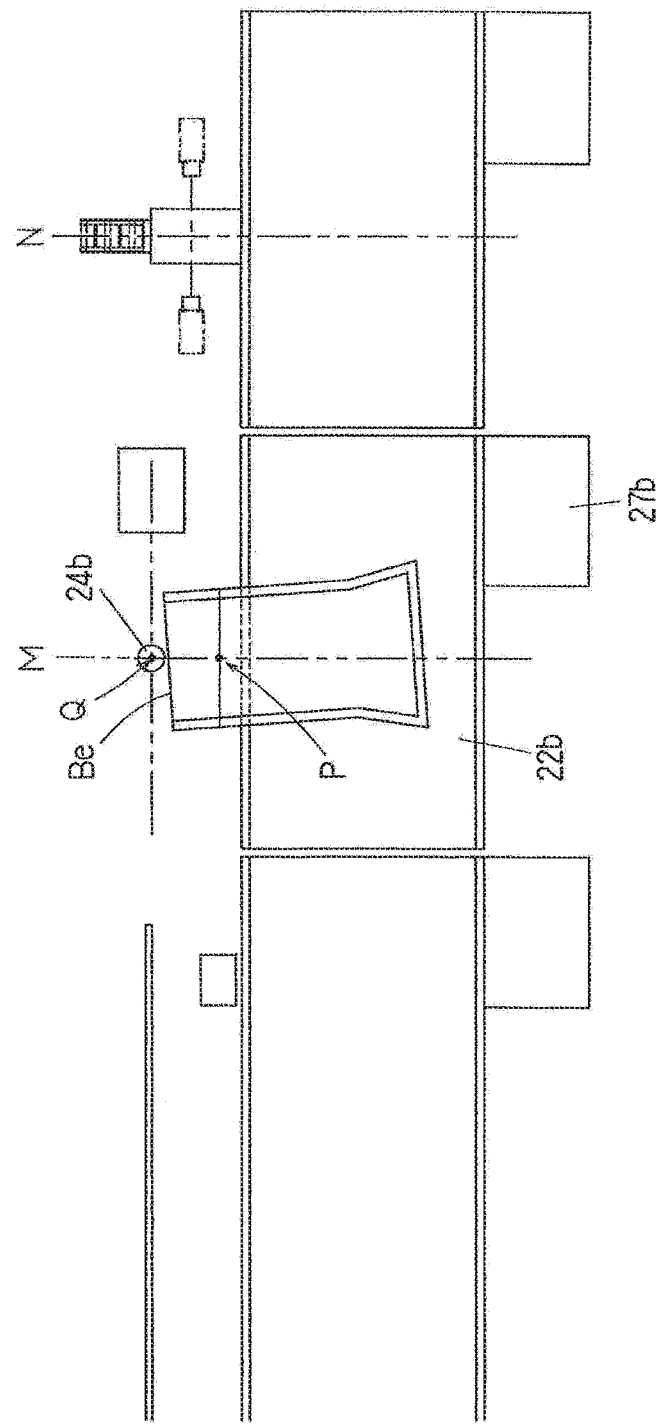
FIG. 22 is a view showing angle adjustment and position adjustment of a bag on the conveyance path in the supplying device illustrated in FIG. 20 in chronological order.

(2) As shown in FIG. 21, the sensor 24a determines the position information on the bag width of the bag B on the sub-conveyor 22a in a direction parallel to the conveyance path (=the determined bag width D) and the position information on the center P of the bag width. Subsequently, the bag B is transferred onto the sub-conveyor 22b.

(3) One vertical plane which is parallel to the reference plane N is set as a reference plane M at a stop position on the sub-conveyor 22b which is set as one stop position just before the last stop position (bag takeoff position Pa) for a bag B. The control device 15 controls the servo motor 27b according to the position information on the center P of the determined bag width D of the bag B so as to adjust the intermittent conveyance distance of the sub-conveyor 22b in such a manner that, when the sub-conveyor 22b is stopped next time, the center P of the bag B which stops at said stop position on the sub-conveyor 22b is situated on the reference plane M (see FIG. 22). In other words, when the center P of the determined bag width D of the bag B is situated on the reference plane M, the sub-conveyor 22b is stopped.

(4) The sensor 24b detects a bag surface of the bag B (including the bag opening edge Be) at a particular position Q on the reference plane M, and the control device 15 controls operation of the servo motor 71 according to that detection results of the sensor 24b. Specifically, if the sensor 24b detects the bag opening edge Be at the particular position Q when the bag B is stopped at the stop position on the sub-conveyor 22b, the control device 15 judges that the bag B is situated at the lengthwise reference position and causes the servo motor 71 not to operate. In the other cases, the control device 15 judges that the bag B deviates from the lengthwise reference position and causes the servo motor 71 to operate so as to move the sub-conveyor 22b in a direction perpendicular to the conveyance direction, and when the sensor 24b detects the bag opening edge Be at the particular position (when the bag B reaches the lengthwise reference position), the control device 15 halts the servo motor 71. In the example shown in FIG. 22, the sensor 24b does not detect a bag surface at all at the particular position Q. In this case, the control device 15 judges that the bag B deviates from the lengthwise reference position towards the bag bottom side and causes the sub-conveyor 22b to move towards the bag opening side (see FIG. 23), and when the sensor 24b detects the bag opening edge Be at the particular position Q (when the bag B reaches the lengthwise reference position), the control device 15 halts the servo motor 71 (and sub-conveyor 22b).

Figure 23:
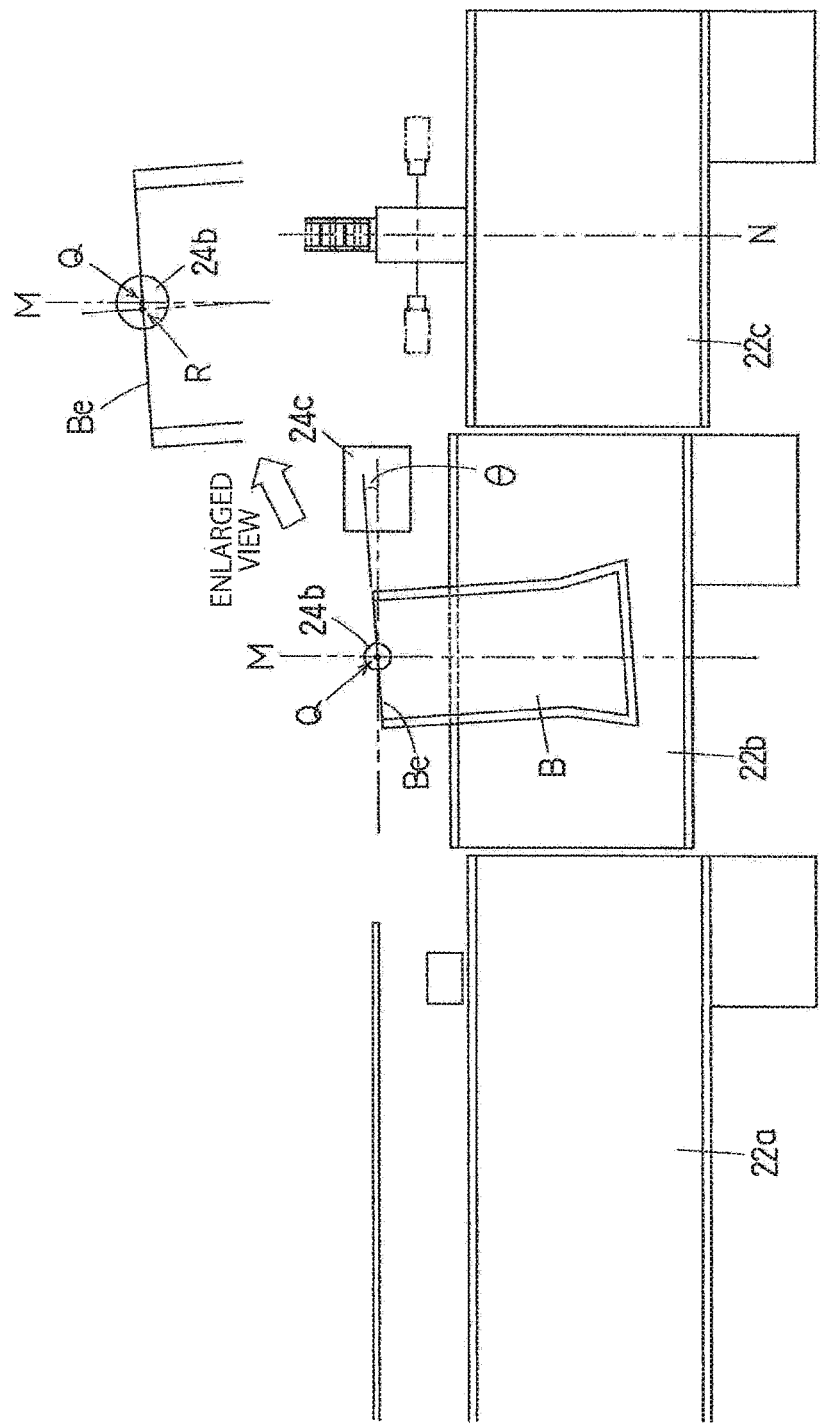
FIG. 23 is a view showing angle adjustment and position adjustment of a bag on the conveyance path in the supplying device illustrated in FIG. 20 in chronological order.
Figure 24:
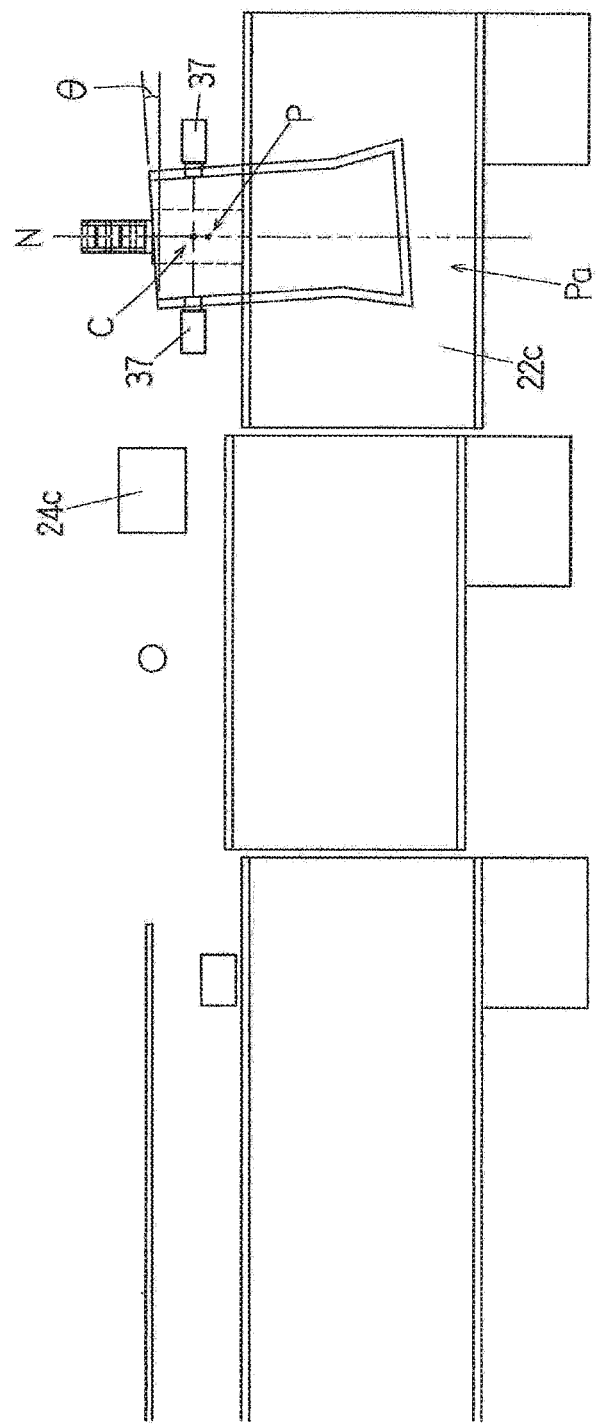
FIG. 24 is a view showing angle adjustment and position adjustment of a bag on the conveyance path in the supplying device illustrated in FIG. 20 in chronological order.

As shown in the enlarged view in FIG. 23, the part where the reference plane M intersects with the bag opening edge Be (particular position Q) slightly deviates from the center R in the width direction of the bag B (the center of the bag opening edge Be) both in a direction parallel to the conveyance path and in a direction perpendicular to the conveyance path. Therefore, if the bag B is inclined, it cannot be said, in a precise sense, that the bag B is situated at the lengthwise reference position, but it can be said, in an approximate sense, that the bag B is situated at the lengthwise reference position.

(5) While the belt conveyor 22 (sub-conveyors 22a, 22b, 22c) is operated and a bag B is transferred on the sub-conveyor 22b, the inclination angle θ of the bag B (the inclination angle θ of the bag opening edge Be with respect to the conveyance path) is determined by the sensor 24c. Specifically, the positions of both ends of the bag opening edge Be of the bag B are determined by the sensor 24c, and the control device 15 calculates the inclination angle θ based on the determination results of the sensor 24c. Subsequently, the bag B is transferred to the sub-conveyor 22c from the sub-conveyor 22b, and is conveyed to a next stop position (takeoff position Pa) and is stopped there (see FIG. 24). In this situation, the control device 15 controls operations of the sub-conveyors 22b, 22c in such a manner that the center P of the determined bag width D of the bag B is situated on the reference plane N. The center P of the determined bag width D of the bag B which stops at the takeoff position Pa slightly deviates from the axis C. The gap between the axis C and the center P becomes larger as the gap between the position of the bag B placed on the sub-conveyor 22a and the lengthwise reference position becomes larger.

After the bag B stops at the takeoff position Pa, the pair of holding members 37, 37 reaches the takeoff position Pa. In this situation, the pair of holding members 37, 37 is in the reference position and the alignment direction is parallel to the conveyance path.

Figure 25:
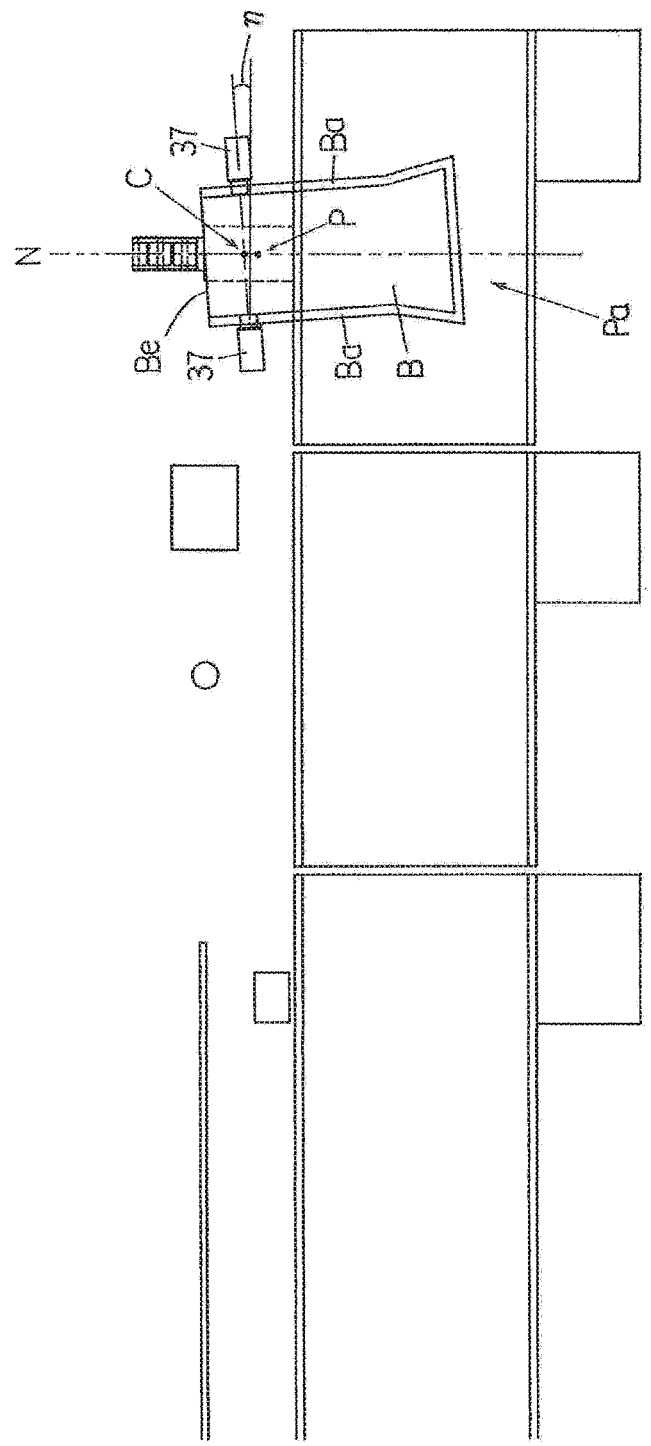
FIG. 25 is a view showing angle adjustment and position adjustment of a bag on the conveyance path in the supplying device illustrated in FIG. 20 in chronological order.

(6) The fourth servo motor 65 (see FIG. 17) is operated according to the inclination angle (θ) of the bag B determined by the sensor 24, the pair of holding members 37, 37 swings around the axis C from the reference position by an angle η (=θ) and the alignment direction becomes parallel to the bag opening edge Be of the bag B, and subsequently the pair of holding members 37, 37 is closed and holds the both side edges Ba, Ba of the bag B (see FIG. 25). When the center P of the determined bag width D of the bag B slightly deviates from the axis C of the pair of holding members 37, 37, it cannot be said, in a precise sense, that the center in the width direction (a direction of the bag opening edge Be) of the bag B does not coincides with the center of the pair of holding members 37, 37 (axis C), but it can be said that they approximately coincides with each other.

The subsequent behavior of the pair of holding members 37, 37 is the same as that of the pair of holding members 37, 37 of the supplying device 1C.

[Yet Another Example in which the Bag Transfer Means has a Function of Adjusting the Alignment Direction of the Pair of Holding Members]

Next, yet another example in which an intermittent conveyance type is adopted and the bag transfer means has a function of adjusting the alignment direction of the pair of holding members, is described with reference to FIG. 27.

Figure 27:
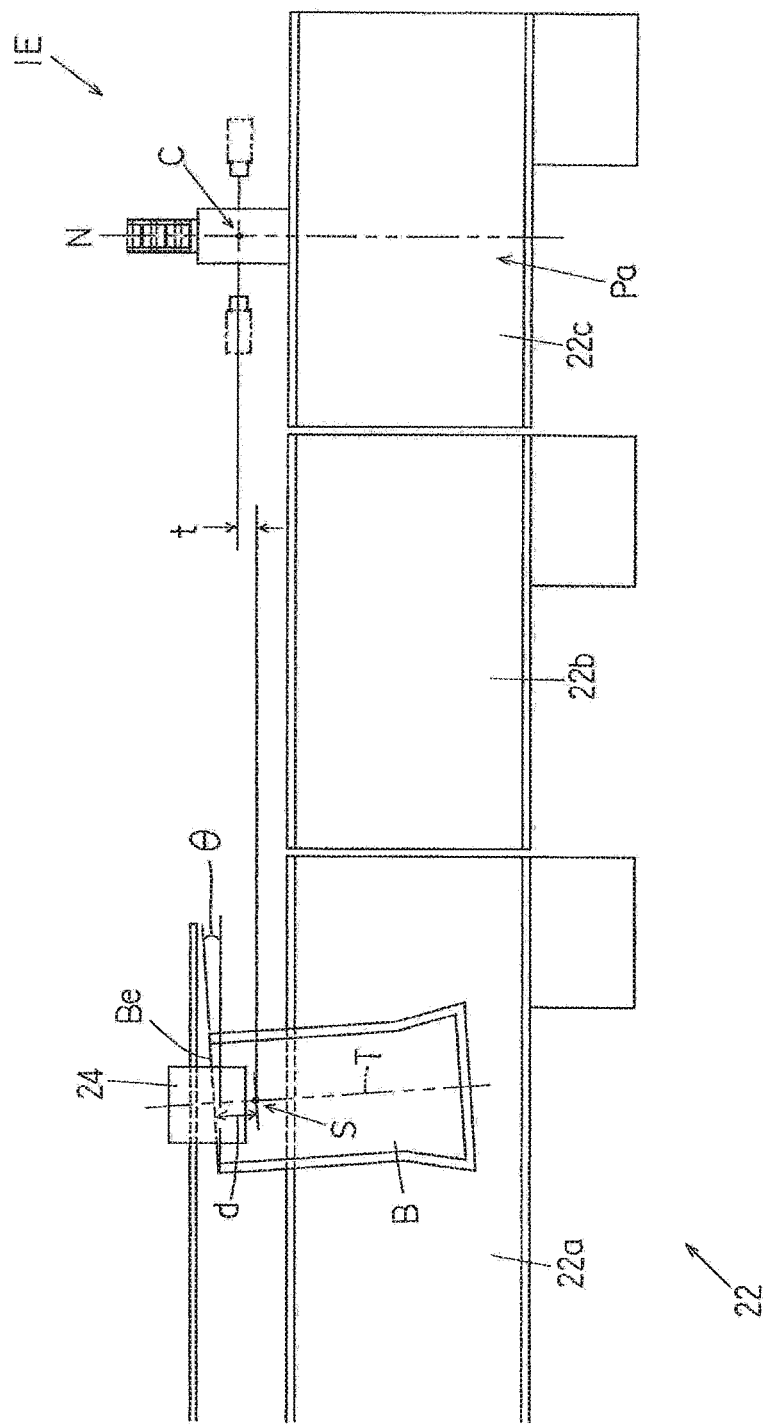
FIG. 27 is a top view describing angle adjustment and position adjustment of a bag on the conveyance path of a supplying device according to yet another embodiment of the present invention.

A supplying device 1E shown in FIG. 27 is different from the supplying device 1D mainly in the following two points, and is substantially the same as the supplying device 1D in the other points.

(1) The sensor 24 includes one camera (e.g., a CCD imaging sensor or a CMOS imaging sensor) provided above the sub-conveyor 22a. The sensor 24 (camera) determines, at a stop position on the sub-conveyor 22a, the position information on a particular position S on a bag B (a spot which is located on a straight line T perpendicularly dividing the bag opening edge Be of the bag B in half and is distanced from the bag opening edge by a certain distance d), and the inclination angle $\theta$ of the bag B (inclination angle $\theta$ of the bag opening edge Be with respect to the conveyance path). Said distanced is set depending on the bag type (e.g., size) in such a manner that the sealing of the bag opening carried out in the vacuum chamber 4 is performed at a proper position.

(2) The control device 15 controls the servo motors 27a, 27b, 27c, 71 for the belt conveyor 22 (22a, 22b, 22c) in such a manner that, when a bag B stops at a stop position on the sub-conveyor 22c (takeoff position Pa), the particular position S of the bag B on the sub-conveyor 22c coincides with the axis C.

One example of the behavior of the supplying device 1E is briefly described below, in chronological order, with reference to FIG. 27.

(1) In FIG. 27, a bag B is stopped at the stop position on the sub-conveyor 22a, and in this situation, the camera (sensor 24) obtains the inclination angle $\theta$ and the position information on a particular position S on the bag B. Further, based on the position information on the particular position 5, the gap length t between the particular position S and the axis C (gap length in a direction perpendicular to the conveyance path) is calculated.

(2) The belt conveyor 22 (sub-conveyors 22a, 22b, 22c) is operated and the bag B is transferred to the sub-conveyor 22b, and subsequently the bag B is stopped at the stop position set on the sub-conveyor 22b.

(3) The control device 15 controls the servo motor 71 based on the gap length t so as to cause the sub-conveyor 22b to move in a direction perpendicular to the conveyance path in such a manner that the gap length t becomes zero. When "t=0" is satisfied from the very start, it is judged that the bag B is in the lengthwise reference position and therefore the servo motor 71 is not operated.

(4) Subsequently, the belt conveyor 22 (sub-conveyors 22a, 22b, 22c) is operated, and the bag B is transferred to the sub-conveyor 22c, is conveyed to the next stop position (takeoff position Pa) and is stopped there. In this situation, the control device 15 controls the servo motors 27b, 27c for the sub-conveyors 22b, 22c so as to adjust the intermittent conveyance distance of the sub-conveyors 22b, 22c in such a manner that the particular position S of the bag B is situated on the reference plane N. The gap length t between the particular position S and the axis C becomes zero on the sub-conveyor 22b (the bag B is situated on the lengthwise reference position), and therefore the particular position S is situated on the axis C at the takeoff position Pa.

After the bag B is stopped at the takeoff position Pa, the pair of holding members 37, 37 reaches the takeoff position Pa. In this situation, the pair of holding members 37, 37 is situated at the reference position and the alignment direction is parallel to the conveyance path.

The subsequent behavior of the pair of holding members 37, 37 is the same as that of the pair of holding members 37, 37 of the supplying device 1D.

The invention claimed is:

1. A method of supplying a bag, comprising the steps of:
   placing a bag on a conveyance unit, the bag being filled with a solid material and having an unsealed bag opening;
   conveying the bag in a substantial width direction of the bag along a predetermined conveyance path while keeping the bag in a substantially horizontal posture; and
   causing a pair of holding members to hold both side edges of a part in a neighborhood of the bag opening of the bag at a takeoff position set on the conveyance path, and subsequently causing the pair of holding members to transfer the bag to a delivery position along a predetermined transfer pathway, wherein:
   one vertical plane perpendicular to the conveyance path is set as a reference plane,
   an interval of the pair of holding members holding the both side edges of the bag which has been conveyed to the takeoff position is adjusted to correspond to a bag width which is in a direction parallel to the conveyance path and which is detected at a part in a neighborhood of the bag opening of the bag, and
   both a center of the bag width of the bag which has been conveyed to the takeoff position and a center of the pair of holding members holding the both side edges of the bag are situated on the reference plane.

2. The method of supplying a bag as defined in claim 1, wherein:
   the conveyance unit intermittently conveys the bag and halts the bag at the takeoff position,
   position information on the bag width and position information on a center of the bag width are detected in course of conveyance carried out by the conveyance unit, the interval of the pair of holding members holding the both side edges of the bag halting at the takeoff position is adjusted according to the detected position information, an intermittent conveyance distance of the conveyance unit is adjusted, and thereby the center of the bag width of the bag halting at the takeoff position is situated on the reference plane.

3. The method of supplying a bag as defined in claim 1, wherein:
   an inclination angle of the bag with respect to the conveyance path is detected in course of conveyance carried out by the conveyance unit,
   the interval of the holding members holding the both side edges of the bag conveyed to the takeoff position is adjusted to correspond to a bag width in a direction parallel to the width direction of the bag calculated based on the inclination angle and the bag width,
   an alignment direction of the pair of holding members with respect to the conveyance path is adjusted based on the inclination angle, and thereby the alignment direction of the pair of holding members holding the both side edges of the bag conveyed to the takeoff position is parallel to the width direction of the bag, and the alignment direction of the pair of holding members is returned to an original condition on the transfer pathway.

4. The method of supplying a hag as defined in claim 1, wherein the pair of holding members swings around an axis perpendicular to the reference plane within a range of approximately 90 degrees, and while the bag is transferred from the takeoff position to the delivery position, posture of the bag is changed from a substantially horizontal posture to a substantially vertical posture.

5. The method of supplying a bag as defined in claim 1, wherein:

the conveyance unit continuously conveys the bag at a constant speed, the pair of holding members is able to be transferred in the direction parallel to the conveyance path, and before the bag reaches the takeoff position, the pair of holding members follows the bag and the interval of the pair of holding members is gradually narrowed while the holding members are positioned on an upstream side and on a downstream side of the bag respectively, in course of conveyance carried out by the conveyance unit, position information on the bag width and position information on a center of the bag width are detected, a movement speed of the pair of holding members following the bag is adjusted according to the detected position information, the interval of the pair of holding members holding the both side edges of the bag which has been conveyed to the takeoff position is adjusted, and when the bag is conveyed to the takeoff position and the center of the bag width reaches the reference plane, the center of the pair of holding members simultaneously reaches the reference plane.

6. The method of supplying a bag as defined in claim 5, wherein, when the bag is conveyed to the takeoff position and the center of the bag width reaches the reference plane, the movement of the pair of holding members in the direction parallel to the conveyance path is halted.

7. The method of supplying a bag as defined in claim 5, wherein the pair of holding members is transferred at a same speed as the bag until the bag is conveyed to the takeoff position and the center of the bag width reaches a position which is set to be distanced from the reference plane on a downstream side by a predetermined distance.

8. The method of supplying a bag as defined in claim 1, wherein, while the bag is transferred on the transfer pathway or after the bag reaches the delivery position, the interval of the pair of holding members is enlarged to strain the bag opening of the bag.

9. The method of supplying a bag as defined in claim 8, wherein the interval of the pair of holding members is enlarged according to a nominal width of the bag.

10. The method of supplying a bag as defined in claim 8, wherein, when the interval of the pair of holding members is enlarged, a degree of tension of the bag is detected, and the interval of the pair of holding members is adjusted according to the detected degree of tension.

11. An apparatus of supplying a bag, comprising:

a conveyance unit on which a bag being filled with a solid material and having an unsealed bag opening is placed and which intermittently conveys the bag in a substantial width direction of the bag along a predetermined conveyance path while keeping the bag in a substantially horizontal posture; and a pair of holding members which holds both side edges of a part in a neighborhood of the bag opening of the bag at a takeoff position set on the conveyance path and is transferred to a delivery position along a predetermined transfer pathway, wherein:

one vertical plane perpendicular to the conveyance path is set as a reference plane, the conveyance unit includes a first servo motor serving as a driving source, the apparatus of supplying a bag further comprises a bag transfer unit, a detection unit and a control device and the bag transfer unit includes the pair of holding members, the bag transfer unit further includes: a second servo motor adjusting an interval of the pair of holding members; and a reciprocating transfer mechanism which transfers the pair of holding members back and forth between the takeoff position and the delivery position, a center of the pair of holding members is situated on the reference plane at the takeoff position, the detection unit is provided on an upstream side of the conveyance path with respect to the takeoff position and detects position information on a bag width in a direction parallel to the conveyance path at a part in a neighborhood of the bag opening of the bag conveyed by the conveyance unit and position information on a center of the bag width, and the control device controls the first servo motor according to the position information on the center of the bag width detected by the detection unit so as to adjust an intermittent conveyance distance of the conveyance unit in such a manner that the center of the bag width of the bag which halts at the takeoff position is situated on the reference plane, and controls the second servo motor according to the bag width detected by the detection unit so as to adjust the interval of the pair of holding members at the takeoff position depending on the bag width.

12. The apparatus of supplying a bag as defined in claim 11, wherein:

in the bag transfer unit, the pair of holding members is supported while the pair of holding members is able to swing around an axis which is perpendicular to holding surfaces of the pair of holding members and which passes through the center of the pair of holding members, the bag transfer unit includes a fourth servo motor causing the pair of holding members to swing back and forth around the axis, the detection unit detects an inclination angle of the bag conveyed by the conveyance unit, with respect to the conveyance path, the control device controls the second servo motor so as to adjust the interval of the pair of holding members to correspond to a bag width in a direction parallel to the width direction of the bag calculated based on the inclination angle and the bag width, and controls the fourth servo motor according to the inclination angle in such a manner that a direction of alignment of the pair of holding members is parallel to the width direction of the bag at the takeoff position, and the direction of alignment of the pair of holding members is returned to an original condition on the transfer pathway.

13. The apparatus of supplying a bag as defined in claim 11, wherein, while the pair of holding members is transferred in the transfer pathway or after the pair of holding members reaches the delivery position, the control device operates the second servo motor so as to enlarge the interval of the pair of holding members according to a nominal width of the bag and strain the bag opening of the bag.

14. The apparatus of supplying a bag as defined in claim 11, further comprising a torque detection unit which detects torque applied to the second servo motor,
wherein, while the pair of holding members transfers the bag from the takeoff position to the delivery position or after the pair of holding members reaches the delivery position, the control device operates the second servo motor so as to enlarge the interval of the pair of holding members and strain the bag opening of the bag, and when the torque detected by the torque detection unit reaches a predetermined value, the control device halts the second servo motor.

15. The apparatus of supplying a bag as defined in claim 11, wherein:
the bag transfer unit includes swinging arms which swing around an axis perpendicular to the reference plane within a range of approximately 90 degrees,
the pair of holding members and the second servo motor are installed with the swinging arms, and
while the pair of holding members is transferred from the takeoff position to the delivery position, posture of the bag is changed from a substantially horizontal posture to a substantially vertical posture.

16. The apparatus of supplying a bag as defined in claim 11, further comprising a bag guide unit which guides the bag held by the pair of holding members moving along the transfer pathway,
wherein the bag guide unit is positioned below the transfer pathway and along the transfer pathway, and includes a plurality of contact members which contact the bag which is being transferred.

17. An apparatus of supplying a bag, comprising:
a conveyance unit on which a bag being filled with a solid material and having an unsealed bag opening is placed, and which continuously conveys the bag at a constant speed in a width direction of the bag along a predetermined conveyance path while keeping the bag in a substantially horizontal posture; and
a pair of holding members which holds both side edges of a part in a neighborhood of the bag opening of the bag at a takeoff position set on the conveyance path and is transferred to a delivery position along a predetermined transfer pathway, wherein:
one vertical plane perpendicular to the conveyance path is set as a reference plane,
the conveyance unit includes a first servo motor serving as a driving source,
the apparatus of supplying a bag further comprises a bag transfer unit, a detection unit and a control device and the bag transfer unit includes the pair of holding members,
the bag transfer unit further includes: two second servo motors which are able to independently transfer the holding members in a direction parallel to the conveyance path; and a reciprocating transfer mechanism which transfers the pair of holding members back and forth between the takeoff position and the delivery position,
the detection unit is provided on an upstream side of the conveyance path with respect to the takeoff position and detects position information on a bag width in the direction parallel to the conveyance path at a part in a neighborhood of the bag opening of the bag conveyed by the conveyance unit and position information on a center of the bag width, and
the control device controls the two second servo motors according to the position information on the bag width and the position information on the center of the bag width detected by the detection unit in such a manner that, before the bag is conveyed to and reaches the takeoff position, the pair of holding members follows the bag and the interval of the pair of holding members is gradually narrowed while the holding members are positioned on an upstream side and on a downstream side of the bag respectively, and when the bag is conveyed to the takeoff position and the center of the bag width reaches the reference plane, the center of the pair of holding members is situated on the reference plane and the interval of the pair of holding members corresponds to the bag width.

18. The apparatus of supplying a bag as defined in claim 17, wherein, when the bag is conveyed to the takeoff position and the center of the bag width reaches the reference plane, the control device causes the pair of holding members to halt in the direction parallel to the conveyance path.

19. The apparatus of supplying a bag as defined in claim 17, wherein, after the bag reaches the takeoff position and until the center of the bag width reaches a position which is set to be distanced from the reference plane on a downstream side by a predetermined distance, the control device causes the pair of holding members to be transferred at a same speed as the bag.

20. An apparatus of supplying a bag, comprising:
a conveyance unit on which a bag being filled with a solid material and having an unsealed bag opening is placed, and which continuously conveys the bag at a constant speed in a width direction of the bag along a predetermined conveyance path while keeping the bag in a substantially horizontal posture; and
a pair of holding members which holds both side edges of a part in a neighborhood of the bag opening of the bag at a takeoff position set on the conveyance path and is transferred to a delivery position along a predetermined transfer pathway, wherein:
one vertical plane perpendicular to the conveyance path is set as a reference plane,
the conveyance unit includes a first servo motor serving as a driving source,
the apparatus of supplying a bag further comprises a bag transfer unit, a following transfer mechanism, a detection unit and a control device, the bag transfer unit includes the pair of holding members, and the following transfer mechanism transfers the bag transfer unit back and forth in a direction parallel to the conveyance path,
the bag transfer unit further includes: a second servo motor adjusting an interval of the pair of holding members; and a reciprocating transfer mechanism which transfers the pair of holding members back and forth between the takeoff position and the delivery position,
the following transfer mechanism includes a third servo motor serving as a driving source,
the detection unit is provided on an upstream side of the conveyance path with respect to the takeoff position and detects position information on a bag width in the direction parallel to the conveyance path at a part in a neighborhood of the bag opening of the bag conveyed by the conveyance unit and position information on a center of the bag width, and the control device controls the second and third servo motors according to the position information on the bag width and the position information on the center of the bag width detected by the detection unit in such a manner that, before the bag is conveyed to and reaches the takeoff position, the pair of holding members follows the bag and the interval of the pair of holding members is gradually narrowed while the holding members are positioned on an upstream side and on a downstream side of the bag respectively, and when the bag is conveyed to the takeoff position and the center of the bag width reaches the reference plane, the center of the pair of holding members is situated on the reference plane and the interval of the pair of holding members corresponds to the bag width.

* * * * *